(12) United States Patent
Tavanez et al.

(10) Patent No.: US 12,333,507 B2
(45) Date of Patent: Jun. 17, 2025

(54) PEER-TO-PEER SELECTABLE DIGITAL MONEY SYSTEM

(71) Applicant: XiXventures, LLC, San Antonio, TX (US)

(72) Inventors: Paul Roger Tavanez, San Antonio, TX (US); Richard Lee Grogan, Fountain Valley, CA (US)

(73) Assignee: XiXventures, LLC, Huntington Beach, CA (US)

( * ) Notice: Subject to any disclaimer, the term of this patent is extended or adjusted under 35 U.S.C. 154(b) by 0 days.

(21) Appl. No.: 16/714,692

(22) Filed: Dec. 14, 2019

(65) Prior Publication Data

US 2021/0182804 A1    Jun. 17, 2021

(51) Int. Cl.
G06Q 20/06    (2012.01)
G06Q 20/38    (2012.01)
H04L 9/06    (2006.01)

(52) U.S. Cl.
CPC ....... *G06Q 20/065* (2013.01); *G06Q 20/3829* (2013.01); *H04L 9/0637* (2013.01); *H04L 2209/56* (2013.01)

(58) Field of Classification Search
USPC .......................................................... 705/39
See application file for complete search history.

(56) References Cited

U.S. PATENT DOCUMENTS

| | | |
|---|---|---|
| 8,275,714 B2 | 9/2012 | Eugenio |
| 8,315,952 B2 | 11/2012 | Algiene |
| 8,738,539 B2 | 7/2014 | Al-Herz |
| 9,165,297 B2 | 10/2015 | Al-Herz |
| 9,171,324 B2 | 10/2015 | Al-Herz |

(Continued)

FOREIGN PATENT DOCUMENTS

| | | |
|---|---|---|
| CN | 107230051 A | 10/2017 |
| CN | 107230051 B | 6/2021 |

(Continued)

OTHER PUBLICATIONS

Ali Syed et al., A Comparative Analysis of Blockchain Architecture and Its Applications: Problems and Recommendations, Dec. 4, 2019, IEEE Access, vol. 7, pp. 176838-176869. (Year: 2019).*

(Continued)

*Primary Examiner* — Bennett M Sigmond
*Assistant Examiner* — George N. Proios
(74) *Attorney, Agent, or Firm* — KPPB LLP

(57) ABSTRACT

A peer-to-peer (P2P) digital money system using selectable types of: digital money; digital currency; digital coin; utility token; virtual currency; cryptocurrency; electronic currency, to manage value utilizing: a software process of steps and methods; network teller nodes and teller network validation using: communication networks; encoding of descriptive data fields and properties; value denominations, creating direct personal physical possession and selectable physical embodiment, with automatic or manual financial transactions, performing transaction authorization using: storage systems; distributed mesh storage, creating: a digital commerce system; an aggregator handling system, with a digital minting system and a selectable value influencing system.

20 Claims, 13 Drawing Sheets

(56) References Cited

U.S. PATENT DOCUMENTS

| | | | |
|---|---|---|---|
| 9,398,018 | B2 | 7/2016 | MacGregor |
| 9,406,054 | B2 | 8/2016 | Al-Herz |
| 9,710,808 | B2 | 7/2017 | Slepinin |
| 9,830,580 | B2 | 11/2017 | MacGregor |
| 10,055,720 | B2 | 8/2018 | MacGregor |
| 10,521,777 | B2* | 12/2019 | Zhou ................ G06Q 20/4012 |
| 10,776,761 | B2* | 9/2020 | MacGregor ............ G06Q 20/10 |
| 2016/0342988 | A1* | 11/2016 | Thomas et al. |
| 2017/0132625 | A1* | 5/2017 | Kennedy .............. G06Q 20/065 |
| 2017/0132626 | A1* | 5/2017 | Kennedy .............. G06Q 20/401 |
| 2017/0148016 | A1* | 5/2017 | Davis ..................... G06Q 20/02 |
| 2018/0039960 | A1* | 2/2018 | MacGregor ............ G06Q 20/06 |
| 2018/0060860 | A1* | 3/2018 | Tian .................. G06Q 20/3829 |
| 2018/0374094 | A1 | 12/2018 | Kohli |
| 2019/0130391 | A1 | 5/2019 | Wright et al. |
| 2019/0295069 | A1 | 9/2019 | Pala et al. |
| 2020/0242711 | A1 | 7/2020 | Cao et al. |
| 2021/0065300 | A1* | 3/2021 | Leshner ............ G06Q 20/3829 |
| 2023/0004955 | A1 | 1/2023 | Tavanez et al. |

FOREIGN PATENT DOCUMENTS

| | | |
|---|---|---|
| KR | 20190115553 A | 10/2019 |
| KR | 20200139012 A | 12/2020 |
| KR | 102308185 B1 | 10/2021 |
| KR | 20220056036 A | 5/2022 |
| WO | 2024054899 A1 | 3/2024 |

OTHER PUBLICATIONS

Zaghloul et al., Bitcoin and Blockchain: Security and Privacy, Apr. 25, 2019, arXiv: 1904.11435. (Year: 2019).*

Akhtar et al., Potential of Blockchain Technology in Digital Currency: a Review, Dec. 1, 2019, 16th International Computer Conference on Wavelet Active Media Technology and Information Processing, pp. 85-91. (Year: 2019).*

Don Tapscott, "Blockchain Revolution", Brilliant Audio, Grand Haven, Michigan, ISBN:9781511357661, 2016.

Daniel Roth, "The Future of Money: It's Flexible, Friction-less, and (Almost) Free", Wired Magazine, ASIN:B003HCOCVG, Mar. 2010.

International Search Report and Written Opinion for International Application No. PCT/US2023/073624, Search completed Dec. 27, 2023, Mailed Dec. 27, 2023, 7 Pgs.

International Written Opinion Application No. PCT/US2023/073624, Filing Date: Sep. 7, 2023, Report Completed Dec. 27, 2023, 4 pgs.

Islam et al., "A Low-Cost Cross-Border Payment System Based on Auditable Cryptocurrency with Consortium Blockchain: Joint Digital Currency", IEEE Transactions on Services Computing, 2022, vol. 16, Issue 3, pp. 1616-1629.

* cited by examiner

| Claim | Primary | Secondary | Tertiary | Claim | Primary | Secondary | Tertiary |
|---|---|---|---|---|---|---|---|
| 1. | FIG. 2 | FIG. 3 | – | 9x. | FIG. 2 | FIG. 10 | FIG. 12 |
| 1a. | FIG. 2 | FIG. 3 | – | 9y. | FIG. 5 | FIG. 6 | FIG. 2 |
| 1b. | FIG. 4 | FIG. 2 | FIG. 3 | 9z. | FIG. 3 | FIG. 2 | FIG. 9 |
| 1c. | FIG. 2 | FIG. 3 | FIG. 10 | 9aa. | FIG. 6 | FIG. 5 | FIG. 3 |
| 1d. | FIG. 4 | FIG. 5 | FIG. 3 | 9ab. | FIG. 5 | FIG. 6 | FIG. 12 |
| 1e. | FIG. 4 | FIG. 5 | FIG. 3 | 10. | FIG. 3 | FIG. 2 | FIG. 9 |
| 1f. | FIG. 2 | FIG. 3 | – | 10a. | FIG. 8 | FIG. 3 | FIG. 2 |
| 1g. | FIG. 3 | FIG. 6 | FIG. 5 | 10b. | FIG. 5 | FIG. 8 | FIG. 6 |
| 1h. | FIG. 5 | FIG. 6 | FIG. 2 | 11. | FIG. 5 | FIG. 6 | FIG. 2 |
| 2. | FIG. 5 | FIG. 6 | FIG. 2 | 11a. | FIG. 7 | FIG. 2 | FIG. 6 |
| 2a. | FIG. 5 | FIG. 6 | FIG. 9 | 11b. | FIG. 3 | FIG. 2 | FIG. 6 |
| 2b. | FIG. 4 | FIG. 3 | FIG. 2 | 11c. | FIG. 2 | FIG. 3 | FIG. 10 |
| 2c. | FIG. 3 | FIG. 6 | FIG. 5 | 11d. | FIG. 7 | FIG. 6 | FIG. 5 |
| 2d. | FIG. 5 | FIG. 6 | FIG. 3 | 12. | FIG. 8 | FIG. 9 | FIG. 7 |
| 3. | FIG. 5 | FIG. 6 | FIG. 7 | 12a. | FIG. 7 | FIG. 2 | FIG. 5 |
| 3a. | FIG. 8 | FIG. 2 | FIG. 3 | 13. | FIG. 5 | FIG. 6 | FIG. 3 |
| 3b. | FIG. 5 | FIG. 6 | FIG. 2 | 13a. | FIG. 7 | FIG. 5 | FIG. 6 |
| 4. | FIG. 6 | FIG. 5 | FIG. 7 | 13b. | FIG. 7 | FIG. 5 | FIG. 6 |
| 4u. | FIG. 5 | FIG. 6 | FIG. 12 | 13c. | FIG. 6 | FIG. 5 | FIG. 7 |
| 5. | FIG. 2 | FIG. 3 | FIG. 8 | 13d. | FIG. 6 | FIG. 3 | FIG. 5 |
| 5a. | FIG. 8 | FIG. 3 | FIG. 2 | 13e. | FIG. 3 | FIG. 2 | FIG. 5 |
| 5b. | FIG. 7 | FIG. 8 | FIG. 11 | 13f. | FIG. 5 | FIG. 3 | FIG. 8 |
| 5c. | FIG. 3 | FIG. 2 | FIG. 10 | 14. | FIG. 8 | FIG. 3 | FIG. 5 |
| 5d. | FIG. 5 | FIG. 6 | FIG. 3 | 14g. | FIG. 8 | FIG. 9 | FIG. 6 |
| 5e. | FIG. 7 | FIG. 3 | FIG. 2 | 14h. | FIG. 6 | FIG. 5 | FIG. 10 |
| 6. | FIG. 6 | FIG. 5 | FIG. 2 | 15. | FIG. 9 | FIG. 6 | FIG. 3 |
| 6a. | FIG. 5 | FIG. 6 | FIG. 2 | 15b. | FIG. 5 | FIG. 6 | FIG. 8 |
| 6b. | FIG. 7 | FIG. 2 | FIG. 9 | 15c. | FIG. 10 | FIG. 6 | FIG. 3 |
| 7. | FIG. 3 | FIG. 6 | FIG. 8 | 15d. | FIG. 11 | FIG. 10 | FIG. 6 |
| 8. | FIG. 3 | FIG. 2 | FIG. 6 | 16. | FIG. 9 | FIG. 6 | FIG. 3 |
| 8a. | FIG. 3 | FIG. 6 | FIG. 5 | 16a. | FIG. 9 | FIG. 11 | FIG. 3 |
| 8b. | FIG. 6 | FIG. 3 | FIG. 5 | 16b. | FIG. 9 | FIG. 11 | FIG. 5 |
| 8c. | FIG. 7 | FIG. 5 | FIG. 6 | 17. | FIG. 12 | FIG. 3 | FIG. 6 |
| 8d. | FIG. 7 | FIG. 5 | FIG. 6 | 17a. | FIG. 12 | FIG. 3 | FIG. 6 |
| 8e. | FIG. 7 | FIG. 6 | FIG. 2 | 17b. | FIG. 12 | FIG. 11 | FIG. 10 |
| 8f. | FIG. 5 | FIG. 8 | FIG. 6 | 17c. | FIG. 12 | FIG. 11 | FIG. 5 |
| 9. | FIG. 6 | FIG. 8 | FIG. 3 | 17d. | FIG. 12 | FIG. 11 | FIG. 5 |
| 9u. | FIG. 8 | FIG. 2 | FIG. 5 | 17e. | FIG. 12 | FIG. 11 | FIG. 5 |
| 9v. | FIG. 5 | FIG. 6 | FIG. 2 | 18. | FIG. 14 | FIG. 6 | FIG. 5 |
| 9w. | FIG. 2 | FIG. 10 | FIG. 12 | 18u. | FIG. 14 | FIG. 6 | FIG. 5 |

FIG. 1

PEER-TO-PEER SELECTABLE DIGITAL MONEY SYSTEM

BACKGROUND

COPYRIGHT NOTIFICATION: This patent disclosure is Copyright@, 2019 as published, with all right reserved, the only exception being the creation or use of a facsimile reproduction, wherein the verbiage and figure drawings have not been materially altered, facilitating the use any combinatorial set of: patent research; patent notification; patent validation. All use of the Copyright@ material, including "fair use" conditions only where legally required, must not parse, bifurcate, nor edit the said material in a manner that materially affects either the overall meaning or specifically listed contextual meaning or both.

1. FIELD OF INVENTION

The present invention generally relates to a digital money system, using either digital money or digital currency or both, a hardware process; a software program, a digital money communication network; wherein the digital money is either in a digital medium or in a selectable physically embodied or both; the software to manage the digital money network system; software to manage and transform the digital money; a communication network for use and validation of the digital money; the implementation of a digital commerce system; the implementation of a digital aggregator handling system; a digital money minting system.

2. PRIOR ART

1. All discussion in this section or specification should no way be considered acknowledgment or acceptance that any information of prior art is generally known including any general knowledge of the field.
2. Currency that is safe, reliable, and strong, to support the economic exchange of goods and services, has always been needed. Currencies allow different parties to: exchange economic goods and services, keep and maintain any combinatorial set of: store-of-value; financial transaction value; collector value; similar economic value; and to have a contingency planning store-of-value. The historical state of analogue currency or analogue fiat currency technology has been a compromise of higher costs including creation, theft, debasement, transportation, and security; it has significant inadequate properties including: physical loss, physical decay, expensive processing, no inherent traceability, tax capture loss, and requires continuous physical security. Either a properly implemented digital money or properly implemented digital currency or both, will significantly reduce the many costs to society and to any specific economic participant.
3. Currency as a proxy economic value was historically created, maintained, enforced, and arbitrated with an outside-the-transaction third-party that was either a strong power figure, a king, an emperor, a government, a financial institution, or another powerful party. This third-party trust structure has failed to hold value, has systemically been inflated, has repeatedly been cheated or defrauded in numerous way, and has significant inefficiency costs. Either a properly implemented digital money or a properly implemented digital currency or both, will significantly reduce systemic risks, volatility, costs, and enable more efficient choices to society and to any specific economic participant.
4. The relatively recent implementation of inexpensive computing and worldwide digital networking has allowed physical currency to become abstracted to a more efficient digital system. Either a properly implemented digital money or properly implemented digital currency or both, will systemically create value across society by decreasing the cost of economic activity.
5. The current state of development for digital money, digital currency, virtual currency, and cryptocurrency are systemically flawed, having limited use or special case use in virtual communities or other small scale groups. The previous use has been very limited and not generally beneficial to society at large. It appears generally known that these solutions have inherent security issues, technical limitations, scaling limitations, and use case limitations. Either a properly implemented digital money or a properly implemented digital currency or both, will scale and be generally available for wide-scale use.
6. The recent and the widespread use of cryptocurrency systems was enabled by various parties and systems; there remains numerous flaws in the current technical state including: security; theft; fraud; incompetence of either design or implementation or both; a general lack of traceability; computing waste; energy waste; timeliness of transaction close; and a myriad of other deficiencies. Either a properly implemented digital money or a properly implemented digital currency or both, will significantly mitigate the many design flaws for society and to any specific economic participant.
7. Many implementations of cryptocurrency rely on blockchain technology, an extremely inefficient and wasteful technology; with insufficiency throughout the design, it relies on computing time waste, computing storage waste, energy waste, human capital waste, and poor timeliness of transaction close. Existing blockchain technology is difficult to use as it requires the user to download, store, and upload the very large blockchain database, generally prior to use. On smaller devices or mobile devices, this is very expensive and wasteful. A properly implemented either digital money or a properly implemented digital currency or both, will systemically and fundamentally displace the current blockchain technology over time as the said blockchain technology is extremely difficult to use and very detrimental to the physical environment, destroys unconscionable volumes of electrical energy, and remains very poor at optimizing human capital.
8. The current development of the technological state in the area of digital money is limited and wasteful, the current state is peer-server-peer; the current many implementations are not implemented as true peer-to-peer systems. Many in the industry reference the current many design implementations as peer-to-peer, not fully appreciating the actual network topology as peer-server-peer. The technological state of development for the many types of digital money including any combinatorial set of: digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value; other similar terms for transacting either digital value or economic value or both, are all built on complex, expensive, and third-party based digital systems. They use either a centralized point server or a set of centralized point servers or both. From this structure, the actual value is held, synchronized, and allocated to various users on an assigned basis from within the servers and the servers alone. Any specific user simply holds a key value to grant the said user an allocation right to assign another user in the centralized database for the assigned digital currency or value. A properly implemented either digital money or a properly implemented digital currency or both, will systemically and fundamentally displace the current centralized model and allow a true implementation of a more efficient and free-scaling peer-to-peer network configuration.

9. Current digital money, including digital currency, virtual currencies, cryptocurrencies, and digital currencies have inefficient pricing volatility and store-of-value, speculation like pricing behavior, and poor technical implementations; this vastly limits their effective use for economic transactions, economic activity, investment, and for store-of-value holding. Either a properly implemented digital money or a properly implemented digital currency or both, will seek to maintain either a more stable value or a smoother price.

10. Third-party agency trust and confidence issues remain a systemic risk for any combinatorial set of: fiat currency; digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value. These many risks include digital theft, institutional failure, market failure, government fiat currency inflationary theft, government fiat currency failure, or general societal systemic failure; this outcome is most readily achieved through inefficient economic policy, wide-scale war, catastrophic civil events, or environmental events. Digital commerce systems have been developed; they have all of the embedded flaws based on their current social interactions and technological implementations. Either a properly implemented digital money or a properly implemented digital currency or both, will systemically and significantly reduce as many third-party risks to the society and to any specific economic participant as possible.

11. Currency commerce models as previously implemented are expensive, have security risks, and are economically inefficient. Intrinsic value currency or bullion currency has optimal value, making the use of inflation and debasement more difficult; system-wide theft is highly 175 restricted. The physical nature of these currency types has made physical tracking, security, remote transactions, and transportation difficult. When the financial system moved to fiat currency or computerized representations of economic value, the risk relationship was inverted; it was easily inflated, debased, or systemically stolen. Either a properly implemented digital money or a properly implemented digital currency or both, will enable the many benefits of intrinsic value currency, current fiat currency, and computerized value, and simultaneously decreased costs, risks to society, and the systemic risks to any specific economic participant.

12. Currency trading systems, as currently implemented, have security risks, loss risks, and are economically inefficient. The centralized location of database information, system hardware, and user accounts creates a singular worldwide target. Users regularly have currency value stolen and pilfered from centralized economic store-of-value locations. Either a properly implemented digital money or a properly implemented digital currency or both, will enable the many benefits of intrinsic value currency, current fiat currency, and computerized value without the costs or risks to society and to any specific economic participant.

13. Current implementations of currency trading platforms have ongoing security risks, third-party trust agent risks, and a single point of failure. The current design of trading platforms hoard all value in a single system or single database. Essentially, they are recreations of the legacy banking ledger systems wherein an initial party's value is transferred to a secondary party or value is cashed-out by selling current currency credits to a third user; thereafter, the new cash value from the third user is transferred to an another user and so on. Having all of this value in a closed system, is risky and expensive. If the system is accessed intentionally by a nefarious agent or unintentionally destroyed, the value for all parties is removed. If the controlling trust agent accidentally or intentionally removes or destroys value, the value is lost without recourse. In normal operations, even without negative action, the system is inefficient, depends on third-parties, and remains concentrated. Either a properly implemented digital money or a properly implemented digital currency or both, will remove the requirement of third-party holding or control of the currency units or cash value, this will vastly decrease risk. Paradoxically, either a properly implemented digital money or a properly implemented digital currency or both, will allow the full range of existing credit, loans, arbitrage, and other banking type activity without significant impacts.

SUMMARY

Brief Summary of the Invention

SHORT DESCRIPTION OF DRAWINGS

Brief Description of the Drawings

FIG. 1, is a table of reference mappings of the many claims and the associated outline alpha-numeric structuring to the numbered supporting figures for the specifications in the descending order of primary, secondary, and tertiary level of importance.

DETAILED DESCRIPTION

Glossary

Figure 2:
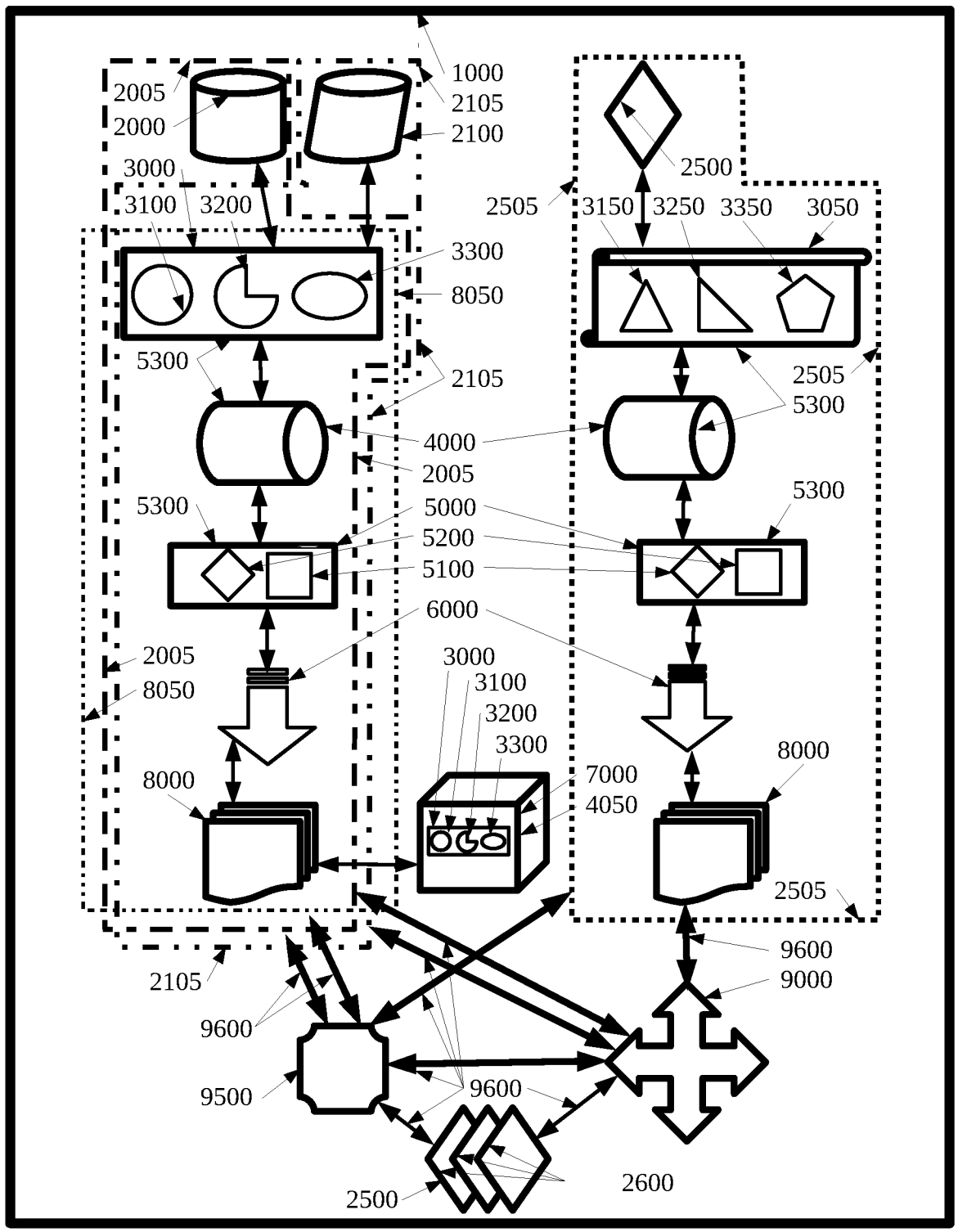
FIG. 2, is a schematic design layout of a preferred embodiment of the digital money system.

The purpose of this glossary is assist with understanding and discussion and to illustrate the various technical components; the glossary does not limit, restrict, or constrain the various claims, rights, and privileges of this application. There are word and term meanings, industry understanding of terms, common nomenclature, and specialized knowledge both within these descriptions and outside these descriptions. This glossary of terms is for understanding and descriptions purposes.

This glossary assists in the specific description, implementation, and design understanding for the included claims and uses. The terms herein are intended to describe the specific properties, case, typology, meaning, and structure of said terms and their specific meaning within the series of claims and the inventions. These specific terms may or may not match the industry prior art, the industry standard use in some cases, and the use of terms for government entities.

There is currently within the industry a continuously overlapping use of the various terms for digital money and the various sub-types of digital currency, with regulators, companies, and customers. The current industry practice is convoluted, the term "virtual currency" has at least three (3) different and conflicting meanings when used by the primary United States of America (USA) Federal regulators. The various states have their own definitions. The cross-use of terms remains typical throughout the industry; great care is required in all term references and uses.

Aggregator Handling System: a computer based framework system that enables either the exchange or the buying and selling or both, and to either transform or transfer or both, either digital money or digital currency or both; using two or more computing devices; by confirming an authorized transaction by transferring ownership from any number of entities to any other number of entities; using either a computerized network or a digital money communication network or both; being user selectable, either the buying node or the selling node computer party may retain some portion of value; using a dynamically and specifically selected combinatorial set of: a fixed percentage, a fixed fee, a scaling fee, a capped fee, a performance fee, a step-wise fee, a time based fee, a similar fee structure, an industry standard fee method, another fee structure. Typically, the said handling can be perceived from an end-user observation as any selected combinatorial set of: third-party handling authorization; third-party trading authorization; third-party exchange authorization; industry standard third-party banking like activity; third-party credit and lending activity; third-party escrow activity; trust account holding; peer-to-peer trading; similar value exchange activity; however, from a technical perspective the aggregator handling system embodiment is entirely different and unique from historical implementations.

Barter: An agreed upon exchange of assets for payment of goods, service, or other value based on an agreement, contract, social obligation, or similar means that uses direct economic goods, assets, or commodities as the under instrument of exchange; specifically, a barter does not use fiat currency within the transaction. Due to contract law and custom, any transaction using either digital money or digital currency are generally consider a barter transaction and without a third-party medium of exchange. The difference in the legal definition between a commodity barter transaction and fiat currency transaction will generally have important legal, contractual, and tax implications.

Collector Value: The value of an asset after initial purchase that is generally derived from the secondary market value or from the psychological value of the object. The value can vary in a positive or negative way from the functional value, material value, or use value. In the use of digital money and with similar related assets, this value would generally be additive to the redeemed value, stated value, or functional market value; if negative, this value would typically be null or disregarded due to the commodity nature of the underlying either commodity or asset or both.

Cryptocurrency: is used as a digital value system or digital store-of-value or both; being secured by some form of cryptography; it allows geographically disparate transfer-of-ownership. With either standard or historical cryptocurrency, the ownership is not held locally, nor held personally, nor physically embodied with the local user storage. When implemented with a blockchain, cryptocurrency is a sub-type of digital money that is a system wherein the total value and information is held in many remotely located and distributed database shards of cryptographically encoded information, being available in digital form. Typically, in historical blockchain implementations cryptocurrency ownership is simply a data field in a remote non-owned database, it is extremely similar to a normal banking account journal entry, except that the database is cryptographically encoded and geographically distributed to different shards of information. Generally, it is regulated as a commodity or a good wherein the individual units have substantial interchangeability as a store-of-value.

Denomination: either currency amount types or store-of-value levels or both, comprising a dynamically and specifically selected combinatorial set of: different step-wise value, different varying values, different value levels, different value increments, different value percentages, different value decimal values, different value fields. Denominational representation of value allow either percentage allocations or fractional allocations of value or both, that can more closely align with the agreed either economic value or other value or both as negotiated.

Digital Commerce System: a computer based framework system that enables either economic transactions or economic exchange or both, of any selected combinatorial set of: store-of-value; financial transaction value; collector value; similar economic value; using a computerized network; of either computing devices or physically embodied value or both, to either transform value or transfer value or both; from either any number of places or any number of entities or both, to either any number of other places or any number of other entities or both; wherein the framework supplies the ability to exchange a dynamic and specifically selected combinatorial set of: store-of-value; financial transaction value; collector value; commodity value; digital money; in exchange for a selected combinatorial set of: fiat currency; commodities; merchandise; services; labor; similar economic value; similar financial value; digital money.

Digital Coin: An individual representation of a digital record of any selected combinatorial set of: store-of-value; financial transaction value; collector value; similar economic value. For the many claims, the term "Digital Coin" is inclusive of the definition of the sub-type "unitary digital coin" and the industry standard "digital coin" definition. The use of the term "digital coin" operates under many names in the industry and in regulations; some of the used names include: utility token, "coin" (digitally represented), "unit" (digitally represented), digital money (in the singular), digital currency (in the singular), similar derived names. Generally, a digital coin is regulated as a commodity or a good wherein the individual units have substantial interchangeability as a store-of-value. A commodity is generally considered fungible and equivalent per unit. From a user perspective the commodity can be treated and perceived as money, fiat currency, or other similar instruments; however, it is not in fact said instruments. The difference in the legal definition between a commodity and fiat currency will generally have important legal, contractual, and tax implications.

Digital Currency: a sub-type of either computer defined digital money or digital value or both, comprised of a dynamically and specifically selected combinatorial set of: store-of-value; financial transaction value; collector value; commodity value; available in a dynamically and specifically selected form of: digital media; digital record; network data record; the user or system or both, selects to store value as either digitally stored or when selected physically embodied or both, in a dynamically and specifically selected set of: physical currency notes; physical coins; similar selected physical medium. The store-of-value is maintained by a dynamically and specifically selected set of: scarcity of use; scarcity value; scarcity by work expended; scarcity cost of production; limit of total supply available. Digital currency exhibits some value properties similar to physical banknote currencies or coins; additionally, it can allow for digital transaction transfer-of-ownership and geographically disparate transfer-of-ownership. The term digital currency is often incorrectly used for the meaning of the term digital money. Digital currency is generally a sub-group type of the general type of digital value referred to as digital money. In most cases, the terms either cryptocurrency or virtual currency or both are used, the term digital currency refers to the subgroup of digital money that excludes the cryptocurrency type and the virtual currency types. Generally, digital currency is regulated as a commodity or a good wherein the individual units have substantial interchangeability as a store-of-value. A commodity is generally considered fungible and equivalent per unit. From a user perspective the commodity can be treated and perceived as money, fiat currency, or other similar instruments; however, it is not in fact said instruments. The difference in the legal definition between a commodity and fiat currency will generally have important legal, contractual, and tax implications.

Digital Medium: a storage method and process wherein either data fields or data properties or both, are digitally stored; that is enabled by either a software process or a hardware process or both; the digital data being stored by either a dynamically selected or specifically selected or both, of any combinatorial set of: digital data; digital files; digital fields; digital encoding, wherein the data can be stored, either synchronously or asynchronously or both, with any combinatorial set of: data and storage activity; independent data units; independent action and activity; independent data records and entries; multiple data copy records; other similar digital storage activity.

Digital Money: a meta-group of computing based money or computing based currency inclusive of any selected combinatorial set of: economic store-of-value, financial transaction value, collector value; that is generally available in any form of either digital media or through digital network data or both; digital money is inclusive of any of the different computerized or digitally transformed selectable currency subgroups inclusive of any selected combinatorial set of: digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value; variations of computer based money; computerized economic store-of-value. When the digital money is transformed into either a selected physical embodiment or an alternate physical embodiment or both, the selected embodiment of digital money is either embodied or transformed into a physical medium; thereafter, if selected, it can be referenced as the physidigital currency subgroup as is inclusive of any selected combinatorial set of: physical digital money notes with digital information, physical digital coins, unitary digital coins, any similar physically encoded medium holding digital money value. Generally, digital money is regulated as a commodity or a good wherein the individual units have substantial interchangeability as a store-of-value. A commodity is generally considered fungible and equivalent per unit. From a user perspective the commodity can be treated and perceived as money, fiat currency, or other similar instruments; however, it is not in fact said instruments. The difference in the legal definition between a commodity and fiat currency will generally have important legal, contractual, and tax implications.

Digital Money Processing System: a software process of steps, using within it a process and a method, that either manages or transforms data and transmission on a dynamically and specifically selected combinatorial set of: digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value, typically, the software runs on computing devices, stores data in storage devices, and transmit over a communication network; in an alternative embodiment and when selected, the said software process either transforms or transmits or both the value into a physical embodiment of the digital money or the digital money sub-type.

Digital Money Communication Network: a software process of steps, using within it a process and a method, communicating between at least three or more nodes of either hardware or software or both; between any number of computer nodes, inclusive of; any number of sending computers; any number of answering or receiving computers; any number of validation teller computers; any number of aggregator handling nodes, utilizing either encrypted data or non-encrypted data or both, in the preferred embodiment encrypted data is used. A specialized network for the processing of digital money wherein information and digital money units are transmitted and transformed to complete an authorized transaction and transfer of both ownership and the digital money unit. Being user selectable, the embodiment of this specialized purpose network will normally use the underlying computer software networking stack, computer, physical network topography, and related standard computer methods.

Digital Money System: a system to utilize digital money for a dynamically and specifically selected combinatorial set of: an economic store-of-value; financial transaction value; collector value; the value maintained by scarcity of use; scarcity value; scarcity by work expended; scarcity cost of production; a limit of total supply available, utilizing processes and methods, including a dynamically and specifically selected combinatorial set of: hardware; software; digital files; digital records; digital money communication network; a selectable physical embodiment; denominations; validation system; storage system; distributed mesh storage system; transaction system; aggregator handling system; selectable value influencing system; digital money minting system.

Distributed Mesh Network: a self-organized network wherein the topology is based on either a dynamically adapting or non-hierarchical structure or both, wherein the individual member devices reside at either the same level or in a flat model or both; that is enabled by either a software process or a hardware process or both; the network connects directly on a peer-to-peer basis directly from any number of disparate nodes to any other number of disparate nodes; the said nodes may be comprised of a dynamically and specifically selected combinatorial set of: computer devices, analogue devices, physical embodiment, or other communication instances, the topology and nodes are configured in either in a locally connected group of nodes or in a distributed number of remotely connected nodes or both; thus allowing a scale-free network with fault-tolerance, highly efficient computation cost, and highly scaling communication speed.

Distributed Mesh Storage System: a storage method and process wherein the communication and storage is stored across a Distributed Mesh Network; the said storage is enabled by either a software process or a hardware process or both, wherein the individual member devices generally reside at either the same level or in a flat model or both; being managed and combined into a dynamically and specifically selected combinatorial set of: digital data; digital data files; digital data fields; digital data encoding, the said data can be communicated and stored with any combinatorial set of: either synchronous storage or asynchronous storage or both; independent data activity; independent storage activity; independent data units; independent action and activity; independent data records and entries; multiple data copy records; other similar digital storage activity.

Encryption: a process of encoding data that attempts to make the message readable by an authorized party while simultaneously indecipherable and unknowable to an unauthorized party. The specific technique or series of processes can be any selected combinatorial set of: a variation of steps; logical implementations; mathematical functions; other modifications as can be imagined, generally the use of encryption includes using an implementation of any selected combinatorial set of: symmetric key; public-private key; mathematical functions; differing levels and types of data padding; key encapsulation; other forms of obfuscation. For this definition, the encryption libraries and encryption methods were previously created in multiple third-party countries specifically outside the United States of America (USA); thereafter, they were imported into the (USA). Generally, the implementation is considered to be strong encryption or cryptographically strong methods. Due to the world-wide industry of digital money theft, both privately sponsored and government sponsored, the strongest level of cryptographic protection is required to guarantee public safety; with Moore's Law observation of computational speed improvements over time, the implementation of vast parallel processing, and the development of quantum computing technology, it is hoped that today's level of strong cryptographic technology security is sufficient to protect the public; in the long run, history generally proves otherwise over time.

Financial Transaction: An agreed upon exchange of assets for payment of goods, service, or other value based on an agreement, contract, social obligation, or similar means. In any financial transaction using either digital money or digital currency, the underlying instrument of value is generally considered a commodity and is typically not yet considered a fiat currency or money. A commodity is generally considered fungible and equivalent per unit. From a user perspective the commodity can be treated and perceived as money, fiat currency, or other similar instruments; however, it is not in fact said instruments. Importantly, due to contract law and custom, any transaction using either digital money or digital currency are generally consider a barter transaction and without a third-party medium of exchange. The difference in the legal definition between a commodity and fiat currency will generally have important legal, contractual, and tax implications.

Hardware Process of Steps: A series of stored steps that is used to facilitate either action or communications or both, to a hardware device from either a software program or the library of transaction methods or both. Generally, the said hardware is a networking device, a networking stack of components, or a virtual network stack of software components to enable communications. It is also a hardware device for transformation to a physical embodiment; this can be inclusive of a stamping machine, a pressing machine, a digital printer, or another form of physical production device. It is also any kind of computing device hardware including a personal computer (PC), server, laptop, tablet, mobile phone, set-top box, and other forms of hardware as implemented for the process requirements.

Method: a process, mechanism, technique, or routine to accomplish some practical application of useful, concrete, and tangible results that brings about a result which possesses a value, something desired, or something of importance; herein, a novel and non-obvious way to create value that is tied to the particular compute technology and process in a meaningful and substantial way. The term 'method' generally supports the many steps and processes within either the "Software Process of Steps and Methods" or in the many claims or both; being shown for technical clarity and for understanding of technical implementation.

Minting Method: a process, mechanism, technique, or routine to produce any of the different computerized selectable digital money subgroups, inclusive of any selected combinatorial set of: fiat currency, digital money; digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value; herein, a novel and non-obvious way to create value that is tied to the particular compute technology and process in a meaningful and substantial way. The term "method" generally supports the many steps and processes within either the "Software Minting Process of Steps and Methods" or in the many claims or both; being shown for technical clarity and for understanding of technical implementation.

Minting Process: either a series of steps or a method or both, wherein a business method is implemented to produce any of the either different computerized or digitally transformed or both, selectable digital money subgroups, inclusive of any selected combinatorial set of: fiat currency, digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value. A means of producing a particular or desired result independently of the producing mechanism. Herein the term "process" generally supports the many parts and components of the claims within the "Software Minting Process of Steps and Methods", being specifically shown for technical clarity and for understanding of technical implementation.

Ownership Transfer: an activity or action wherein either digital money or personal possession of digital money or both, is initially transferred between an existing owner who generally operates in the sender node role and a pending new owner who generally is in the receiver node role. Subsequently, after activity or action, the pending new owner who is in the receiver node role is transformed into the existing owner, concurrently the initial and original existing owner is released from ownership. As an action, this definition and use includes other forms of possession, including but not limited to: selling, buying, renting; leasing; loaning; borrowing; holding-in-trust for any individual or entity or both; holding as either a banking like or trust like institution, either performing banking activity or not performing banking activity or both; holding as a aggregator handling system; holding as an exchange; holding as an escrow services business; holding as a money changing business; acting as a financial clearing house; donating; controlling; other forms of possession as can be implemented.

Peer-to-Peer (P2P): A relationship within a network topography, between two or more different entities, generally herein between either computer devices or computer instances or both, wherein the said different entities are at an equal level of access, communication, and authority and can equally address each computer directly without an intermediary, third-party authority, or external computing entity; generally, the message travels across the direct network hardware switching, connecting pathways, repeating equipment, and any other medium, either wired or wireless or both. This type of relationship can also be known as a point-to-point (PTP) communication network; generally, it is not organized in a broadcast structure, is not in a tiered hierarchy structure, and is not in a limited access structure.

Personal Possession: when an item is locally and physically held. A locally held file or data entry stored on a local held medium is generally considered a personal possession. Either a digital money or a digital currency or both, that on a selectable basis that has been 3D printed, 2D printed, stamped to a physical coin, or otherwise physically embodied is considered a personal possession.

Physidigital Currency: a type of digital money, usually and specifically a sub-type of either digital money or digital currency or both, that is either embodied digitally or embodied physically or both, that locally allows data maintenance, data encoding, and data to be embedded in any selected combinatorial set of: value maintaining encoding data; related currency data; current currency ownership. Physidigital currency generally is not held in a remote disparate database as simple data field entries, nor is it generally stored in a distributed unified database, nor is it generally held in a remote shard or group of cryptographically encoded data. The typical preferred embodiment of physidigital currency uses a software process of steps and methods, a third-party teller computer, a digital money communications network, another party computer to either transfer or receive or both, and includes a dynamically and a specifically selected digital currency. Generally, it is regulated as a commodity or a good wherein the individual units have substantial interchangeability as a store-of-value. Generally, a physidigital currency is regulated as a commodity or a good wherein the individual units have substantial interchangeability as a store-of-value. A commodity is generally considered fungible and equivalent per unit. From a user perspective the commodity can be treated and perceived as money, fiat currency, or other similar instruments; however, it is not in fact said instruments. The difference in the legal definition between a commodity and fiat currency will generally have important legal, contractual, and tax implications.

Physical Embodiment: a physical object, generally occupying two (2) or more physical and spatial dimensions that is a physical representation of either digital money or physidigital currency or both. Typically, a physical embodiment does not include a dynamically and specifically selected combinatorial set of: an entry in a remote database; a record in a third-party record system; or similar non-physical record. A physical embodiment, in the preferred embodiment, is when the digital encoding is maintained in a dynamically selected and specifically selected combinatorial set of: digitally encoded physical coins; digitally encoded on a paper like media; a three dimensional object; a manufactured item; a two (2) dimensional image; a four-dimensional object wherein the shape may or may not change over time and space. Generally, it is regulated as a commodity or a good wherein the individual units have substantial interchangeability as a store-of-value.

Process: either a series of steps or a method or both, wherein a business method is implemented to produce a particular or desired result; a means of producing a particular or desired result independently of the producing mechanism. Herein the term "process" generally supports the many parts and components of the claims within the "Software Process of Steps and Methods", being specifically shown for technical clarity and for understanding of technical implementation. In the industry the "Software Process of Steps and Methods" is normally either a software program or a combined software and hardware device, generally referred to as one or more of: a wallet; digital wallet; e-wallet; coin program; similar terms.

Scarcity of Use: any system of a dynamically and specifically selected combinatorial set of: store-of-value; financial transaction value; collector value; wherein the value is maintained by either a natural limit or imposed limit or both; thus, limiting how often either a particular representation of value or a particular value item can be used.

Scarcity Value: any system of a dynamically and specifically selected combinatorial set of: store-of-value; financial transaction value; collector value; wherein the value or use is maintained by either an opportunity cost displacement of other value or by a limitless want by other market participants or both; thus limiting the availability of either a particular representation of value or a particular value item.

Scarcity by Work Expended: any system of a dynamically and specifically selected combinatorial set of: store-of-value; financial transaction value; collector value; wherein the value is maintained by a dynamically and specifically selected combinatorial set of: forced work value that has either actual costs or perceived costs or both, displacement of either work value or productive work effort or both; thus, limiting the availability of either a particular representation of value or a particular value item by displaced work value or other similar work.

Scarcity Cost of Production: any system of a dynamically and specifically selected combinatorial set of: store-of-value; financial transaction value; collector value; wherein the value is maintained by a dynamically and specifically selected combinatorial set of: forced costs of work effort; cost of material expenditure; labor effort costs; cost of overhead; thus, limiting the availability of either a particular representation of value or a particular value item due to cost recovery or scarcity from other costs.

Software Minting Process of Steps and Methods: herein the definition includes a set of instructions and processes wherein a unique business process and business method is created to generate or spawn unique values, comprised of either data properties or data fields or both, for either digital money or a physical object or both, therein the specific business process is the enabled and controlling mechanism for a computer or machine that creates significant utility. Typically, this is referred to as a "Software Program"; herein specifically a set of steps, instructions, methods, and processes stored to achieve the goal of creating either data properties or data fields or both, for the said many claims and implementations. In the industry the "Software Minting Process of Steps and Methods" is normally referred to as a "Mining", "Minting", "Pressing", "Printing", "Crypto-mining", or similar terms. The complexity of the state of digital computing invention hardware appears as limitless as human invention and is continually evolving. The "software minting process of steps and methods" referenced herein is assumed to "run", "execute", "process", and to functionally process on any functional hardware aggregation upon which the many instructions work, regardless of any specific technical implementation including, but not limited to, any selected combinatorial set of: hardware central processing units (CPU); cache memory; memory subsystems (RAM); hardware storage systems; hard disk; flash storage; NVMe storage; optical storage; tape storage; other industry standard storage; uniquely adapted storage; networking systems; Ethernet; optical networking; wireless networking; telephone based network technology; other industry standard networking method; uniquely adapted network methods; and other computing hardware as needed. An alternate implementation of "Software Minting Process of Steps and Methods" can be in any selected combinatorial set of: firmware, dedicated hardware-software device, read-only computing device, similar computing device implementations.

Software Process of Steps and Methods: herein the definition is expanded to include a set of instructions and processes wherein a unique business process and business method is created to manifest a unique transformation or transfer of either a digital entity or a physical object or both, therein a specific business process is enabled controlling the mechanism for a computer or machine that transfers value creating significant utility. Typically, this is referred to as a "Software Program"; herein specifically a set of steps, instructions, methods, and processes stored to achieve a goal of communication, records, or actions for the said many claims and implementations. In the industry the "Software Process of Steps and Methods" is normally referred to as a "Wallet", "Digital Wallet", "e-Wallet", or in similar terms. The complexity of the state of digital computing invention hardware appears as limitless as human invention and is continually evolving. The "software process of steps and methods" referenced herein is assumed to "run" and to functionally process on any functional hardware aggregation upon which the many instructions work, regardless of any specific technical implementation including, but not limited to any selected combinatorial set of: hardware central processing units (CPU); cache memory, memory subsystems (RAM); hardware storage systems, hard disk; flash storage; NVMe storage; optical storage; tape storage; other industry standard storage; uniquely adapted storage; networking systems; Ethernet; optical networking; wireless networking; telephone based network technology; other industry standard networking method; uniquely adapted network methods; and other computing hardware as needed. See "Transaction Methods" as a referenced sub-set of functionality, either immediately bound to or referenced by or both to library call functions that throughout these many claims as shown separately for functional purposes. In an alternate embodiment, the specific implementation of "software process of steps and methods" can be in any selected combinatorial set of: firmware; dedicated hardware-software device; read-only computing device; similar computing device implementations.

Stack: A collection of components and system parts that when combined provide either a higher level of functionality than the individual component parts or a group level of assigned functionality or both for a desired purpose. When referring to a network stack, it generally includes the hardware networking devices, the hardware system drivers, the many layers of software protocols, and related controlling mechanisms to achieve network communications. When referred to in a node role, it generally includes the controlling software process of methods, the computer hardware system, the storage methods and mechanisms, the network stack, and related parts to achieve a unified and assigned group of behaviors.

Store-of-Value: is the retained value of that can be saved, retrieved and exchanged, from an asset, object, or from other means. With digital money and similar assets, this would be the value received from a third-party upon sale or transfer. It is generally beneficial and optimal if the value between purchase and sale can be maintained and relied upon for future use over time.

Supply-Demand Scarcity Limit: any system of a dynamically and specifically selected combinatorial set of: store-of-value; financial transaction value; collector value; wherein the value is maintained by either a fixed number of available supply or an adaptive number of supply or both;

within a competitive market framework of participants, wherein the natural competitive nature of the market action can reach an economic equilibrium value; thus, limiting the availability of either a particular representation of value or a particular value item.

Teller Node: any computer based system performing a software program having a process of steps and methods; utilizing either a communication network or a digital money communications network or both; transacting with other computer systems with any number of: sending node systems; receiving node systems; teller network systems; aggregator handling node systems, for transformation of any combinatorial set of: fiat currency, digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value, to complete steps for a dynamically and specifically selected combinatorial set of: data validation; transaction authorization; financial transactions; transaction storage management; a selectable value influencing system, enabling a digital commerce system with selectable automation and coordinating with an aggregator handling system.

Trading System: See the glossary entry for "Aggregator Handling System".

Transaction Authorization: a step in a series of transaction steps within a software program having a process of steps and methods; using identity data and other data as technically required; whereby either the digital money ownership or digital currency ownership or both, are approved for either ownership transfer or transformation or both, with the proper, safe, and allowed permission and authorization.

Transaction Methods: a set of stored standard procedures, steps, and processes whereby standardized interaction can be made between a computing based software program to either a hardware device or hardware process of steps or both, typically the hardware can be a networking device, a networking stack of components, or a virtual network stack of software to enable communications. The said transaction methods can be compiled, joined, or held within the said software program. In an alternate embodiment, whereby a dedicated hardware device is created and utilized, the said dedicated hardware is a combination of higher level functionality, including the software, hardware, and transaction methods. The transaction methods can be selected to communicate to a hardware process of steps for physical embodiment, including stamping machines, pressing machines, digital printers, or other forms of physical production devices.

Unitary Digital Coin: An individual representation of any selected combinatorial set of: store-of-value; financial transaction value; collector value; similar economic value, that is defined and derived from within the unique associated unitary digital data representation; this generally includes either a unique standalone digital file instance or a similar standalone unique digital record instance or both. This type of digital money can be compared to a standard gold coin or similar unique unit value represented wherein the value is tied directly to the coin unit itself. A unitary digital coin is not represented by abstracted data entries disconnected from the associated unitary digital representation; a unitary digital coin is not represented in any selected combinatorial set of: an entry in a digital centralized ledger; a database entry in a database; a simple entry in either a shard or slice or both of a blockchain database; similar third-party held "data entry only" record keeping systems. Unitary Digital Coins are not bank ledger like data entry system check-in and check-out data entry assignments. Unitary Digital Coins are standalone and individually separable.

Utility Token: a sub-type of either computer defined digital money or digital value or both, comprised of a selected combinatorial set of: store-of-value; financial transaction value; collector value; commodities; defined and technically configured as a blockchain token of intangible property, defined and initially sold as a consumptive instrument, usually it is a non-investment instrument and can not typically be exchanged before being allowed for consumptive instrument use. The general assumption is that the utility token is open in specification or open-source licensed, unless specifically noted. In specific cases, these tokens can be specification closed or may not meet open-source criteria. Generally, it is regulated as a commodity or a good wherein the individual units have substantial interchangeability as a store-of-value.

Value Influencing System: a method or process of actions that seeks to perform and implement any combinatorial set of: establish a value; maintain value; maintain a value range; seeking order in a market for an item of either value or perceived value or both, for a digital money; that is enabled by either a software process or a hardware process or both; using value influencing system sub-types, through a dynamically and specifically selected combinatorial set of: scarcity of use; scarcity value; scarcity by work expended; scarcity cost of production; supply-demand scarcity limit; other similar method and technique.

Virtual Currency: is defined as a type of historically unregulated digital money, which is issued and usually controlled by its developers; generally, it is used and accepted among the members of a specific virtual community, subgroup, or sub-population for a special or unique purpose outside the typical use of fiat currency or banknotes. Virtual currency can allow for instantaneous transactions and geographically disparate transfer of value. The term is not usually used for: cryptocurrencies; central bank issued money accounted for in a computer database; the subgroup type of digital currency; the subgroup of physidigital currency. Care must be used, many individuals incorrectly use the term virtual currency for the definition of digital money or cryptocurrency, see the glossary definition of "digital money" and "cryptocurrency". Generally, it is regulated as a commodity or a good wherein the individual units have substantial interchangeability as a store-of-value.

Visually Recognized Address: is defined as an digitally stored address that is readily readable and usable for a software process of steps and methods, wherein the said address is derived from a visual representation of an address. The address input is generally any selected combinatorial set of: digital image; digital video image; acoustic pattern image; infrared image; similar image or data input device data; wherein the software process of steps and methods uses any selected combinatorial set of: pattern recognition; algorithmic processes; machine learning processes and libraries; visual recognition libraries; similar computing libraries; hardware recognition computing devices; thereby converting the intelligible visual and graphic address to an address set of digitally stored address data. Thereafter, the digitally stored address is made readily available and usable by the software process of steps and methods. Typically, the input address data is derived from any selected combinatorial set of: mobile phone camera, digital camera, computer webcam, security camera, infrared camera, acoustic pattern input device, other similar image devices. In this particular set of specifications for the particular preferred embodiment, the address is typically an Internet Protocol (IP) Address, today typically being either IPV4 or IPv6 and inclusive of other standards developed or used. The type of address typology or standard is immaterial as the conversion can be adapted to any address typology or standard being in use.

Narrative Description

The system as designed is specifically intended to be a vast improvement in technological implementation, novelty, usability, and invention in the area of: digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value, regardless of the specific permuted name either used or arbitrarily selected or both.

For the many users, the economic system, the governing regulatory bodies, and the natural environment, these many inventions and claims have been primarily made using user-centered design and user-centered development; the optimal wants and needs of the customers and users have been implemented and manifested as primary and most important. These many claims and inventions were developed exclusively with a blank-sheet, a clean-sheet, and an assumption-free design process; no use of any previously known implementation strategies, processing frameworks, networking methods, data storage methods, data properties, data fields, and the many system components are known within this specific invention categories of the many claims. The use of a design, innovation, and invention process that is free of premise and presumption has led to a completely new system resulting in the profound benefits of the many claims, systems, and inventions included throughout the various figures, specifications, glossary, narrative, and throughout this application.

The many claims vastly improve the current state of technological development in the area of digital money by implementing the first true peer-to-peer digital money system. The innovation eliminates the wasteful peer-to-server-to-peer dependency of the current state, generally described as a central server or distributed server configuration. Thereby, innovation is widely achieved throughout the many claims. Through this underlying fundamental difference, all of the many claims herein become unique, novel, and innovative. Removing the current state of peer-to-server-to-peer implementations is better for all parties involved, including the natural environment ecosystem.

Through the selectable configuration and use of the preferred embodiment of the many innovations, the current technological state of: digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value; other similar terms for transacting either digital value or economic value or both, becomes transformed to a more efficient, better scaling, less complex, and less resource wasting technological state. In 2019, the estimated Bitcoin electrical load on the natural environment and technical systems of society is approximately 200,000,000 Kilo-Watt Hours (KWh) or the equivalent of all electrical use for the continent of Australia. Each individual transaction is estimated to use as much power as the average household for 20 days. The current technological state and dependence on the wasteful blockchain technology is unconscionable. Bitcoin and similar blockchain implementations should be ruled illegal under the existing Environment Protection Agency (EPA) requirements. Eliminating the Bitcoin and blockchain electrical waste and abuse the the planet's limited resources remains the single most important innovation of the many claims. It is in society's fundamental interest to support systems that vastly improve environmental resource utilization, especially for non-renewable resources that may additionally contribute to detrimental global environmental change.

The system described throughout, herein referred to as a "digital money system" and the numerous constituent components, is described and shown in only a single possible embodiment and representation. This description is not intended to limit in any way the possible patent rights, claims, any particular embodiment, manifestations, or other rights. The following descriptions and narrations are for understanding of the illustrations and to assist in support of the description throughout.

The selectable use of any combinatorial set of: selectable component parts; selectable subsystems used in any particular implementation; choice of selectable components employed at any point in time; selectable behavior and selectable feature choices; the choice of data typology, enables many inherent meta-security features that create an additional important and significant security macro-functionality. All digital money is inherently more secure if any particular non-authorized party does not know or does not have a readily available model to specifically determine which parts are in use for a particular implementation or in use at any particular unique time. With any combinatorial set of: variance of selectable implementation choices; variance of selectable components; data components, the security for users, the digital money system, and the economic system is vastly increased.

When any selectable component from any of the many claims, including any combinatorial set of: the many subsystems; dependent components; data properties; and the many stated parts, is either implemented or embodied or both, prior to standard-use of the said components, this creates, either a non-preferred or performance optimized or both implementation of the applicable parts of the many claims, specifications, glossary, drawings, narrative, and figures. When a prior to standard-use selection of any selectable component is made, all rights, claims, and patent protections are reserved. In all cases, wherein a prior to standard-use selectable component is made for any combinatorial set of: security; usability; simplicity; similar choices, for either business reasons or technology reasons or both, all rights, claims, protections, and patent rights shall be reserved.

A particular implementation of a prior to standard-use selectable components has already previously been tested and verified in actual use.

To support the award of patent rights, these many inventions and the various claims herein are already significantly implemented in actual computer software code, compiled into working and fully tested machine code, and are embedded in a series of fully functioning products to support business methods and physical transformations. The commercial release of actual products are pending release immediately after this patent claim is submitted. The various claims herein are not theoretical, not imaginary, and are not unsubstantiated. These many inventions and claims are already significantly implemented in multiple operating systems, using physical hardware, within virtual computing environments, running in personal computing devices, and operating within fully functioning servers. These many claims are real, substantiated, and are fully developed.

These many claims are constructed to meet the definition of a process, mechanism, technique, or routine to accomplish some practical application of useful, concrete, and tangible results that brings about results which possesses value, something desired, or something of importance. In some interpretations for patent protection, the documentation of either software processes or business processes or both, have required any combinatorial set of: excruciating detail; fixation to detail; obsessive nuances of detail; pedantic detail. An extreme level of detail, when overly applied to a complex system, can create a value destroying condition wherein the disclosure is excessively complex for someone knowledgeable in the field. To remediate this complexity requirement, these many claims and specifications are presented to clearly demonstrate the claims and invention without creating excessive and incomprehensible detail. The many specifications herein seek to clearly describe the many claims in an algorithmic manner of parts, pieces, and actions without going into excessive detail beyond what would be required for understanding and use for someone knowledgeable in the field.

The current state of computing software, computing hardware, and computing solutions is complex, variegated, and continually evolving. With the widespread use of different scaling hardware based computing solutions, virtual machines, hosted cloud solutions, dedicated hardware, Internet-of-Things (IoT) devices, current inventions, or future inventions, any specific highly detailed hardware based referencing is not usable due to systemic variability. Practically, no description can be made to cover every possible hardware implementation permutation. These claims, specifications, and subsequent inventions are currently running on at least four (4) different hardware configuration types.

There exists an almost infinite number of operating systems, functional libraries, open source software solutions, software programming languages, software code compilers, interpreted software machines, virtual machines, web browser software implementations, and a myriad of other possible software configurations. Defining a specific software implementation at the code level is technically impossible, functionally impractical, and can be immediately bypassed with any mutation within any different specific implementation or with insignificant workarounds. Any specifically developed mutations or workarounds may not be value adding, but may be simply used to obfuscate patent rights and other rights. These claims, specifications, and subsequent inventions are currently running on at least four (4) different software operating system configurations or distributions. The level of detail of listed parts and algorithmic steps herein seek to clearly describe the many claims in an algorithmic manner of parts and actions without going into excessive detail beyond what would be required for understanding and use for someone knowledgeable in the field.

The process and methods described herein have detail, extensive detail, and in some cases excruciating detail. Every effort has been made to create a usable, practical, and implementable series of claims and specifications for someone knowledgeable in the field. The purpose of these many claims and specifications is to make a reasonable notification to the public as to the unique processes, embodiment, and implementations herein. These many claims and specifications are presented with a stringent effort to create the least complicated and most understandable method and preferred embodiment. These claims and specifications seek to be as understandable by someone knowledgeable in the field as functionally possible without being overly complicated. Without such effort and without seeking such clarity, the said claims and specifications would no longer serve their stated function of clarity and disclosure for someone knowledgeable in the field.

In some representations herein and within the many figures, the specifications, and the many claims are demonstrated graphically as a build-up of referenced and related parts. These said referential relationships are shown and demonstrated in the selected preferred embodiment only for clarity of understanding for someone knowledgeable in the field. No actual referential dependency is required for each claim and the related inventions. All of the many claims herein are claimed, specified, and implemented individually; the many claims are freestanding and non-dependent in all cases as technically feasible for any selected embodiment. Any referential dependency is made simply for documentation and understanding purposes for someone knowledgeable in the field. All rights and claims are individually and separably reserved for the many individual claims and the inventions.

Due to the current technical construct of patent implementation practices, the variability of patent rights within the many legal jurisdictions, the current state of legislative law, and existing judicial precedent, the many claims herein seek to patent and establish protection for the several major components and the many inventions from their own unique technical perspective, individually, and with the highest level of separation technically possible. The multiple component individual claim structure has been created to facilitate separable claims and to protect the greatest number of claims; later, if any of the individual claims are possibly denied, invalidated, removed, or otherwise restricted, the remaining claims, inventions, and components remain wholly and individually protected. The separably is also provided to create understanding, documentation, support, and clarity for someone knowledgeable in the field. The many claims herein are specifically defined and enumerated to protect the individual requirements for each component part and each invention, including, but not limited to, any selected combinatorial set of: peer-to-peer (P2P) digital money system, peer-to-peer digital money, peer-to-peer digital money processing system, peer-to-peer automated digital commerce system, digital aggregator handling system, selectable value influencing system, selectable physical embodiment of value, digital minting system, and all claims and all invention components not specifically mentioned in this list.

Due to the complexity of the various parts, subsystems, independent processes, non-linear processes, dependent processes, the software methods of transformation, and either the selectable processes or the required processes or both, the nature of the many parts are described with a set description or grouping description. The narration includes grouping described as "a selection of possible sets" scenarios, as "a dynamically and specifically selected combinatorial set of", as an "either", as an "or", as a "both", as a "neither", and similar logical combination descriptions. These descriptions shall not be limiting in nature; they simply mean any combination of items, example: 'a' alone, 'a' and 'b' together, 'b' alone, or any similar inclusive subset of parts. When either "combinatorial set" or "selected combinatorial set" is used, the set can be a singular member, any combination of members, or all members of the set. This structure adds complexity and allows for an infinitely more secure operating implementation with vast benefits to the users of the many system components. The construct greatly assists understand for someone knowledgeable in the field.

To assist all parties, a glossary of term is supplied, implemented, and specifically included; however, any reference or meaning therein is for illustrative purposes and shall not limit in any way the possible patent rights, claims, any manifestations, any embodiment rights, or other rights. Whereby any conflict in meanings occurs, the meaning that is most correct in context of the overall meaning shall apply; in all cases, the meaning shall include the maximum possible rights afforded by verbiage and interpretation.

The many overall possible parts, subsystems, and dependent components are shown herein, the preferred embodiment has significant obfuscation of functionality in actual use and in actual implementation, this is an intended design and security feature. The use of any component through: modulation, rotation, randomization; is a specific design intent and design feature of the claims, specifications, invention, claim dependent functionality, the claim technology, and the invented innovation. These security features apply both in the digital form and in any particular physical embodiment. Any specific implementation either will or may or both, include any selected combinatorial set of: features listed herein, all of the portions, additional features not listed herein, additional features not specifically described as they are reserved as trade secrets. Any additional components, layers of security, or added parts are an additional features within a complex security matrix. All applied variability shall not limit in any way the possible patent rights, claims, any manifestations, embodiment rights, or other rights.

This disclosure is directed at either a digital money or digital currency or both, a system with interchanging names of: digital money, digital currency; digital coins; unitary digital coins; physidigital currency; utility tokens; virtual currency; cryptocurrency; electronic money; electronic currency; central bank issued money accounted for in a computer database; variations of computer based money; computerized economic store-of-value; other similar terms for transacting either digital value or economic value or both, over either a computer system or a communication network or both. Complicating use, innovation, and embodiment, these terms are continuously cross-linked, interchangeably used, and differently defined by the many various government agencies having jurisdictions in the many various countries, federal agencies, states, and other applicable authorities. Throughout the industry, the many participants employ confusing and often incorrect meaning or referencing to various material items, types of currency, and material processes. To help the specificity of the disclosure, claims, the related sections herein, and to clarify the specific definitions, use, and design, the glossary meanings are included in the glossary definitions. Nothing in the definitions shall limit in any way the possible patent rights, claims, any manifestations, embodiment rights, or other rights.

This disclosure includes any combination of the described and claimed: procedural methods, digital transformation, physical embodiment in a digital medium, physical embodiment in a multidimensional object. Either the digital money or the digital currency or both, can uniquely and individually store value and also be digitally transferred uniquely and individually. On a selectable basis, the said value is physically transferred uniquely and individually; the physical transfer is generally from one place to another place. Normally in use, the initiated location transfer is concurrent with an ownership transfer, although ownership transfer and location transfer are not mutually required; system location transfers either may occur or will occur or both, for record keeping purposes or for other required reasons. This disclosure is inclusive of technological processes and transformation methods to support any selected combinatorial set of: either digital money or a specifically selected digital money sub-type or both; a digital money system of commerce transactions; automated commerce transactions; a digital commerce system; an aggregator handling system; a selectable value influencing system; a minting system for customers.

By allowing either the digital money or the digital currency or both, to be held personally, locally, and uniquely, it is not universally at risk in some unknown remote server, in a remote database, or in a third-party system. The owner's value, security, safety, and useful utility are immediately and greatly increased over the industry's current standard designs that are centrally held, centrally vulnerable, and centrally at risk to third-party agency issues. The decentralized structure and peer-to-peer communication network configuration allows for very efficient use, scale-free communication network speed, and an ease-of-use that is not easily achieved with other designs and in an alternative embodiment.

To maintain value and authenticity of either the digital money or the digital currency or both, within an overall cohesive computing process, the software process transforms information, either with unique mathematical encoding or within data driven properties or both. The process then either validates or encodes or both, the unique data information over either a communication network or a digital money communications network or both; the proven information is then transformed into and over a digital medium or when selected into a physical embodiment or both. This cohesive computing process serves as a guarantee of value and validates the limited availability to either properly approved entities or proper parties or both.

Either the digital money or the digital currency or both, is individually held as a unique item and it is processed at the level of each unit of either the digital money or the digital currency or both; it is then transferred and transformed by a software program having a process of steps and methods; the currency is then sent peer-to-peer from either a digital device or to a selectable physical embodiment or both, to another digital device or another selectable physical embodiment or both. The value, of either the digital money or the digital currency or both, through this system is supplied by a dynamically and specifically selected combinatorial set of: unique software transformation processes; selectable unique digital embodiment; selectable unique physical embodiment; unique physical digital records; network communication; network teller validation; teller network validation; aggregator handling system; selectable value influencing.

For any previous physical embodiment of currency, the invention of widely available and ubiquitous 3D printing has fundamentally changed the physical currency technology framework. Prior to this advancement, the rarity, uniqueness, and scarcity of physical coins and physical currency drove the market value and behavior. With this advancement, any item can be scanned, digitally manipulated, and readily 3D printed in any number of physical materials. The barrier to entry for creating physical coins and physical currency is undermined; in the long run, the value of non-digital or static physical coins and physical currency will be greatly diminished; scarcity will be eliminated. The implementation of a complex, dynamic, and interactive digital currency with physical embodiment greatly advances the technological state and science of physical currency. In this implementation of digital currency with physical embodiment, the currency knows who it's owner is and the owner is embedded in every digital currency with physical embodiment. For the first time, the owner and the currency are united, unified, and tightly bound. There has never been a digital money nor a currency wherein the value is united with personal possession, unitary defined value, and singular direct ownership; these many claims create the first ever representation of possession-ownership-value (POV).

In FIG. 1, shows a table of the many claims by outlined alpha-numeric structuring title and the reference mapping of the associated supporting numbered figure drawings. The direct correlation to the supporting specifications is listed with a descending order of importance from the primary supporting figure, to the secondary supporting figure, and then to the tertiary level supporting figure. The listed figure correlations are not exclusive; there are numerous claims wherein the supporting figure is not exclusively tied to the primary, secondary, and tertiary figures as specifically listed. With the level of complexity of the many claims, the number of claims, the inter-relatedness of the preferred embodiment of the claims, and the multiple component individual claim structure, the said reference table is provided to assist someone knowledgeable in the field a simplified method to more easily and clearly understand the many claims, their correlation to the figures, and thereby the narrative specifications. The supporting details of the outlined claims is shown in the different specification locations and figure drawings as listed. The claim column (0010), shows the claims section outline numeric title and subsection alpha letter locations. The primary column (0020) shows the primary and most supportive figure number and thereby the most supportive narrative specification. The secondary column (0030) shows the secondary and next most supportive figure number and the associated narrative specification. The tertiary column (0040) shows the tertiary and next most supportive figure number and the associated narrative specification. Each of the claim references are thereby supported by the figures and narrative specification.

In FIG. 2, shows the steps for and the means for implementation of the schematic design layout of the digital money system (1000) and the various parts, sub-components, and processes; in the preferred embodiment, due to the nature of digital processes, computing, and software, there are communications and actions throughout, either in two directions or in multiple directions or both.

In FIG. 2, the preferred embodiment, shows the steps for and the means for implementation of the digital money system (1000); any number of sender nodes (2000) and receiver nodes (2100), using any quantity of the digital money (3000), that included a dynamically and specifically selected combinatorial set of: digital money (3000); digital currency (3100); virtual currency (3200); cryptocurrency (3300). Any of these names or types can be in use to adequately address and specify the continuously cross-linked and interchangeably used naming practices of the industry participants and with various government entities. With the software process of steps (5000), using within it a process (5100) and a method (5200), on a dynamically and specifically selected combinatorial set of: digital money (3000); digital currency (3100); virtual currency (3200); cryptocurrency (3300); the currency being stored in a storage system (4000), any of these currency types are either modified or transformed or both, to reflect either value or differing states or both. The software process of steps (5000) creates transaction methods (6000) and also manages a hardware process of steps (8000). This preferred embodiment includes any number of the various sub-component of the digital money system (1000) shown herein, with either digital computing devices running a software process of steps (5000) or selectable physical manipulation processes or both by a hardware process of steps (8000).

In FIG. 2, shows the steps for and the means for the creation of the combined hardware device (8050); for the implementation of an alternative embodiment, inclusive of the software process of steps (5000), a storage system (4000), transaction methods (6000), and hardware process of steps (8000); only when selected, the physical manipulation includes either a selectable physical embodiment (7000) or physical embodiment data (4050) or both, that is either user selected or automation selected or both. The said combined hardware device (8050), being created or 1545 transformed or both, upon a dynamically and specifically selected combinatorial set of: digital money (3000); digital currency (3100); virtual currency (3200); cryptocurrency (3300).

In FIG. 2, shows the steps for and the means for implementation of the peer-to-peer transformation (9600) of the digital money. In the preferred embodiment, the specific selected types of digital money are either transformed or transferred or both, using direct peer-to-peer transformation (9600) over a digital money communication network (9000) or a communication network (9500) or both; these networks are created and utilized as needed for use by the software process of steps (5000), the transaction methods (6000), and the hardware process of steps (8000), thereby creating an overall process and an overall method wherein the management and transformation occurs either physically or digitally or both, with proper transaction authorization of a dynamically and specifically selected combinatorial set of: digital money (3000); digital currency (3100); virtual currency (3200); cryptocurrency (3300).

In FIG. 2, shows the steps for and the means for implementation of the different role node stacks, inclusive of: sender stack (2005); the receiver stack (2105); teller stack (2505). In the preferred embodiment, the different stacks includes the processes, functions, methods, software, hardware, and networking. The node stacks use the parts enclosed within their respective embodiment to perform the sender nodes (2000), receiver nodes (2100), teller nodes (2500), and teller node network (2600) functions as required by the digital money system (1000).

In FIG. 2, the steps for and the means for the implementation of the transaction authorization embodiment is described; using any number of teller nodes (2500), the maintenance and transformation of digital records and transaction states are processed using the software process of steps (5000), for any quantity of digital records for a dynamically and specifically selected combinatorial set of: digital money record (3050); digital currency record (3150); virtual currency record (3250); cryptocurrency record (3350); being stored in a storage system (4000), this assemblage of components creates a unified data processing solution (5300), shown as a simplified storage group. Any of these currency names or currency types can be used to adequately address and specify the continuously cross-linked and interchangeably used naming practices of the industry participants and with various government entities. The digital records and transaction states are communicated using direct peer-to-peer transformation (9600), through either the digital money communication network (9000) or a communication network (9500), when controlled by the software process of steps (5000), the transaction methods (6000), and the hardware process of steps (8000).

In FIG. 2, the steps for and the means for the implementation of the hardware process of steps (8000) is shown. This process and method for using hardware, includes both sub-components and standard hardware for computing devices. There are no specific claims as to the hardware system, hardware devices, and implementation of standard software or parts in this specific sub-component. The novelty and uniqueness for this sub-component is based on the configured and implemented behavior within the overall system and this unique embodiment. The standard sub-component is transformed by interacting with the other components of the system. In the preferred embodiment, the hardware process of steps (8000) is inclusive of any selected combinatorial set of: a network stack of components; a physical network infrastructure; drivers and hardware devices to create a physical embodiment; wired network components; wireless network components; other physical devices as the user either selects or utilizes or both.

In FIG. 2, shows the steps for and the means for implementation of the teller node (2500), with a software process of steps (5000), using a process (5100) and a method (5200), on any quantity of digital records on a dynamically and specifically selected combinatorial set of: digital money record (3050); digital currency record (3150); virtual currency record (3250); cryptocurrency record (3350); performing a dynamically and specifically selected combinatorial set of: communication; validation; management; data storage; data retention; data transformation, acting upon either the current value records or different data states of records or both, utilizing: direct peer-to-peer transformation (9600); digital money communication network (9000) or a communication network (9500) or both; the hardware process of steps (8000); using transaction methods (6000).

In FIG. 2, shows the means for implementation of the teller node network (2600). In the preferred embodiment, as business practice and security protocol decided, using any number of teller nodes (2500), using the teller stack (2505); the maintenance and transformation of digital records and transaction states are processed, replicated, and synchronized to the teller node network (2600), using the software process of steps (5000), for any quantity of currency for a dynamically and specifically selected combinatorial set of: digital money record (3050); digital currency record (3150); virtual currency record (3250); cryptocurrency record (3350); being stored in a storage system (4000), this assemblage of components creates a unified data processing solution (5300), using the same system of communication and use as the teller nodes (2500). After verification of any number of sender nodes (2000) and their recorded currency data, including any number of sender nodes (2000), any number of receiver nodes (2100), any number of teller nodes (2500), and any number of teller nodes (2500) of the teller node network (2600), using the software process of steps (5000), for the requested transaction, the transaction authorization is granted and the peer-to-peer transformation and ownership transfer is completed to the number of receiver nodes (2100). Thereafter, any number of either teller nodes (2500) or the teller node networks (2600) or both replicate, synchronize, and store the new state and current state of the specifically used digital money records, including a dynamically and specifically selected combinatorial set of: digital money record (3050); digital currency record (3150); virtual currency record (3250); cryptocurrency record (3350).

In FIG. 2, shows the steps for and the means for implementation of the digital money system (1000) supporting interaction between any selected combinatorial set of: sender nodes (2000), receiver nodes (2100), teller nodes (2500), teller node network (2600). In the preferred embodiment, the selectable node role type is either negotiated between each node type as either user initiated or automation initiated or both. The different instances of the software process of steps (5000) can operate as any of the other node types as the digital money system (1000) negotiates and as required for process completion. One of the main features, innovations, and benefits of the preferred embodiment of the digital money system (1000), is the adaptive and transformation role state that can be either user selected or automation selected or both, of each node type operating on any number of digital computing devices running a software process of steps (5000), using transaction methods (6000), and a hardware process of steps (8000).

In FIG. 2, and throughout all figures, the steps for and the means for implementation of the preferred embodiment of the systemic and structural securing of data is shown and defined. For all preferred embodiment implementations, when selected and in all node conditions, data encryption is implemented throughout the read-write operations and records, including any selected combinatorial set of: the unified data processing solution (5300); the software process of steps (5000); all storage levels and storage types; the system random access memory (RAM); the system cache; the central processing unit (CPU); the storage system (4000). Data encryption is implemented for the many types of digital money, comprised of any combinatorial set of: digital money (3000); digital currency (3100); virtual currency (3200); cryptocurrency (3300); digital money record (3050); digital currency record (3150); virtual currency record (3250); cryptocurrency record (3350). Data encryption is implemented throughout the transaction methods (6000), throughout the hardware process of steps (8000), when crossing the direct peer-to-peer transformation (9600) over a digital money communication network (9000) or a communication network (9500) or both. Data encryption is implemented when value is transformed into physical embodiment data (4050) and physical embodiment (7000). Data 1700 encryption is implemented for all of the parts and systems of the many claims not specifically listed herein. For all claims, on a selectable basis, the implementation and use of data encryption may be discontinued or not used at either the individual data field or the individual data value or both. For either some fields or some data, as recorded in the individual currency unit records, the selected data may be readily readable; this may be done for easy of use or due to a lack of need for encryption. There is no disclosure herein for the exact encrypted algorithms as that would defeat the purpose of the invention; the exact encrypted algorithms are reserved as a set of trade secrets. There are an innumerable number of possible implementations of encryption known and standardized technology implementations across the industry. The claim herein is the unique configuration, structure, and embodiment; the claim is encryption of the inclusive movement, storage, and encapsulation of data throughout the system and the embodiment of the various sub-components.

Figure 3:
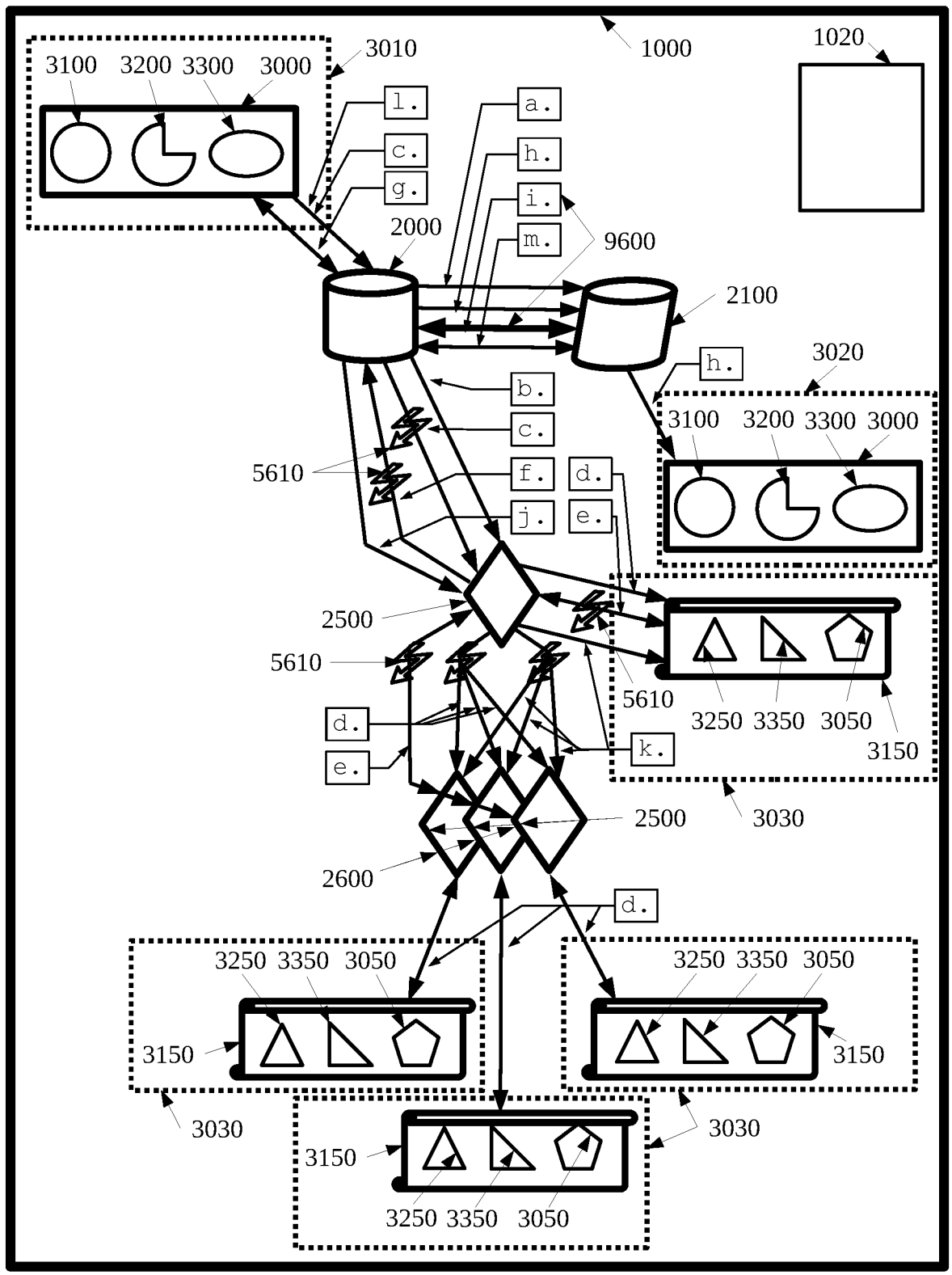
FIG. 3, is a schematic design layout of a preferred embodiment of the digital money system and the supporting algorithmic steps of a transaction for the digital money system.

In FIG. 3, shows the steps for and the means for implementation of the algorithmic steps of a transaction for the digital money system (1000); in the preferred embodiment, completing a direct peer-to-peer transformation (9600) of a dynamically and specifically selected combinatorial set of: digital money (3000); digital currency (3100); virtual currency (3200); cryptocurrency (3300). For reference only and for understanding, FIG. 2 (1020) is referenced; this figure is not required for any particular preferred embodiment and is not required to support specific claims that may reference to this specific figure. Shown are the arrowhead lines representing connection or flow and dashed lines representing included parts of the system collapsed and hidden for clarity. To clarify the preferred embodiment in the most understandable form for someone knowledgeable in the field, some sub-parts are rolled-up within the node roles and are not specifically shown in this figure, including the software process of steps (5000) stack inclusive of the transaction methods (6000), hardware process of steps (8000) stack, and the networking stack of either the digital money communication network (9000) or the communication network (9500) or both. The use of the term sender node (2000) and receiver node (2100) can be reversed in any embodiment, they are simply peer-to-peer (P2P) connections; one node sends and the other node receives. In the preferred embodiment, both the sender node (2000) and receiver node (2100) can establish contact or initiate transfers in either direction to either node type. In the preferred embodiment, the algorithmic steps are described in the order of the following steps:

a) sender node (2000) connects to receiver node (2100).
b) sender node (2000) connects to the teller node (2500).
c) sender node (2000) request a transaction, using multiple-factor transaction authentication (5610), from an initially requested teller node (2500), the sender node (2000) then send records from the digital money sender node storage (3010), supplying the data fields or data properties or both, for a dynamically and specifically selected combinatorial set of: digital money (3000); digital currency (3100); virtual currency (3200); cryptocurrency (3300), to the teller node (2500).
d) Teller node (2500) connects to the teller node network (2600) with a required minimum number of required teller nodes (2500). The teller node network (2600) requests the transaction authorization within its own teller node storage (3030) and with the many teller node network (2600) instances using each of their teller node storage (3030) specific, unique, applicable, and matching selected combinatorial set of: digital money record (3050); digital currency record (3150); virtual currency record (3250); cryptocurrency record (3350).
e) Teller node (2500) verifies, from the teller node storage (3030), the current ownership status of any selected combinatorial set of: digital money record (3050); digital currency record (3150); virtual currency record (3250);
cryptocurrency record (3350), using multiple-factor authentication (5610) with teller node (2500) and the teller node network (2600) and each of the teller node (2500) local teller node storage (3030).
f) Teller node (2500) confirms the multiple-factor authentication (5610) authorization with the sender node (2000).
g) sender node (2000) transforms and encodes the current transaction, in the digital money sender node storage (3010), in the dynamically and specifically selected combinatorial set of: digital money (3000); digital currency (3100); virtual currency (3200); cryptocurrency (3300), 1785 within the digital money sender node storage (3010), including the new receiver ownership state.
h) sender node (2000) sends the digital money (3000) to the receiver node (2100) whereby it is transformed to the digital money receiver node storage (3020) and stored to a dynamically and specifically selected combinatorial set of: digital money (3000); digital currency (3100); virtual currency (3200); cryptocurrency (3300).
i) The receiver node (2100) and the sender node (2000) reconfirm the transaction completion to each other.
j) sender node (2000) confirm transaction completion to the teller node (2500).
k) Teller node (2500) replicates the transaction through any selected combinatorial set of: digital money record (3050); digital currency record (3150); virtual currency record (3250); cryptocurrency record (3350), to the local teller node (2500) and the teller node network (2600), include a required minimum number of teller nodes (2500) and each of their unique teller node storage (3030).
l) For any subsequent digital money (3000) units, the sender node (2000) proceed to step c).
m) After the transactions are fully confirmed, for either the singular unit or all of the units or both, of a dynamically and specifically selected combinatorial set of: digital money (3000); digital currency (3100); virtual currency (3200); cryptocurrency (3300); the sender node (2000) confirms to the receiver node (2100) a completion and disconnect notification, each node then disconnects.

Figure 4:
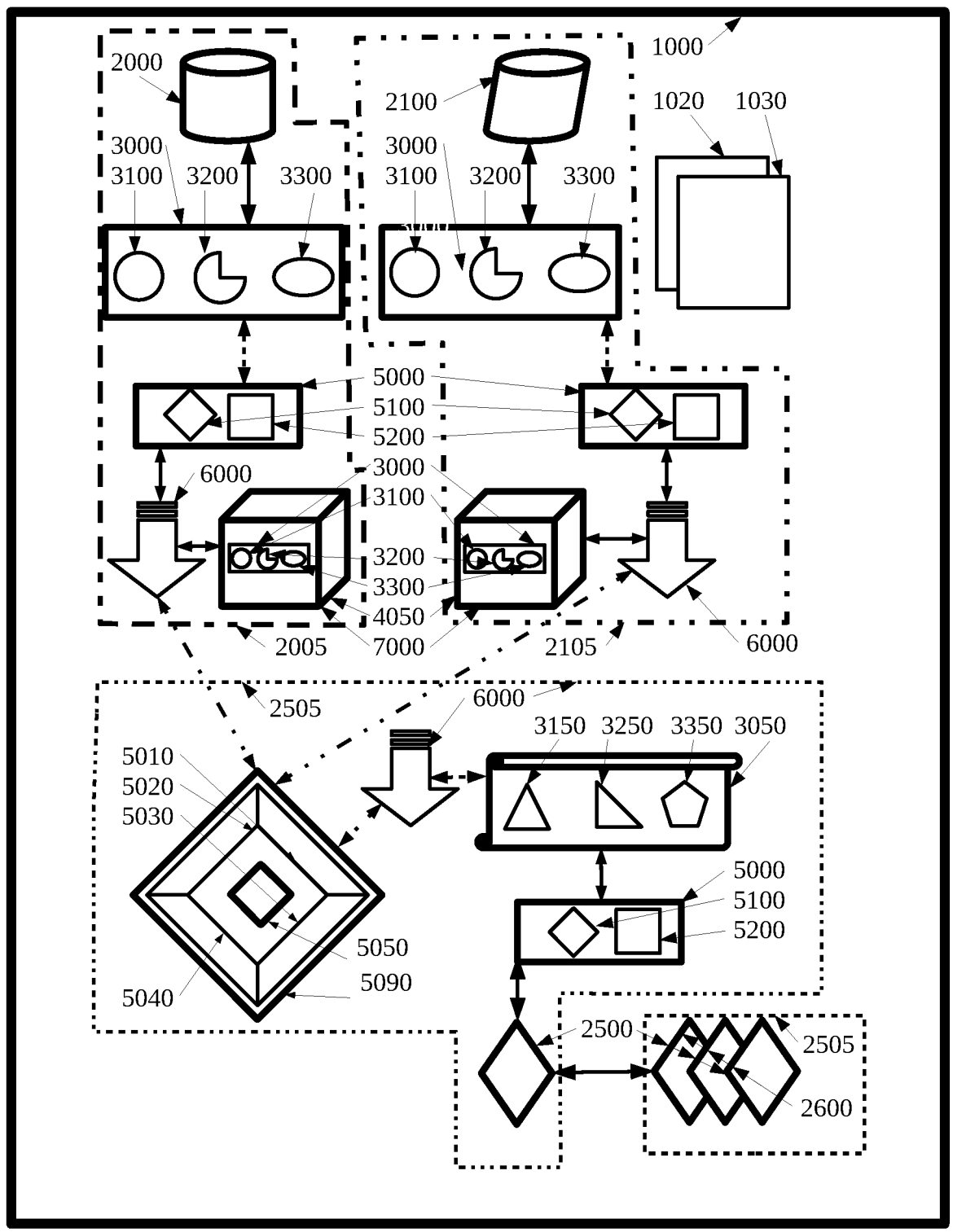
FIG. 4, is a schematic design layout of a preferred embodiment for a value influencing system to influence value using the digital money system.

In FIG. 4, shows the steps for and the means for implementation of a selectable use of a value influencing system (5090) to influence value. The challenge in any money system is maintaining value in a market based system, especially in digital money systems (1000) due to the on-line and connected nature of the market. Due to market price velocity and pricing transparency, maintaining a stable price is an ongoing challenge for all currency systems, regardless of money type, be it physically embodied or in digital form.

In FIG. 4, shows the steps for and the means for implementation of the preferred embodiment of the selectable use of a value influencing system (5090) using the digital money system (1000).

For reference only and for understanding, the many parts are shown in FIG. 2 (1020) and the transaction methods and processes as shown in FIG. 3 (1030) are shown; these figures are not required for any particular preferred embodiment and are not required to support specific claims that may reference to this specific figure. Shown are the arrowhead lines representing connection or flow and dashed lines representing included parts of the system collapsed and hidden for clarity. Shown are the arrowhead lines representing connection or flow and dashed lines representing included parts of the system. In the preferred embodiment, using the said digital money system (1000), the ability to influence value between the several node stacks are shown, including the software process of steps (5000), using within it a process (5100) and a method (5200). In each of their respective node roles and each preferred embodiment, these components include: sender stack (2005); the receiver stack (2105); teller stack (2505); teller node network (2600), using any number of sender nodes (2000), and any number of receiver nodes (2100), as negotiated and authorized by any number of teller nodes (2500), the transaction authorization being controlled by the teller stack (2505) and the teller node network (2600). Shown are the components of the digital money value influencing system (5090) inclusive of: scarcity of use (5010); scarcity value (5020); scarcity by work expended (5030); scarcity cost of production (5040); supply-demand scarcity limit (5050), their interaction being used on a selectable basis and as needed, with data processing between the different node roles. The said components create a value influencing system (5090), thereby influencing the market forces and effects on the dynamically and specifically selected combinatorial set of: digital money (3000); digital currency (3100); virtual currency (3200); cryptocurrency (3300); as stored, communicated, and maintained by transaction methods (6000). When selected for either the physical embodiment (7000) or the physical embodiment data (4050) or both, the volume of available transactions for these types are limited. The teller stack (2505) and teller node network (2600) track the transaction activities through the management and transformation of any quantity of records for a dynamically and specifically selected combinatorial set of: digital money record (3050); digital currency record (3150); virtual currency record (3250); cryptocurrency record (3350). Using the software process of steps (5000), between any number of: sender nodes (2000), receiver nodes (2100), teller nodes (2500), teller node network (2600); a dynamically and specifically selected combinatorial set of: various rules; processes; timing conditions; transaction authorizations; data modifications; data validations; are employed and implemented within the digital money system (1000). These many parts and processes create a digital money value influencing system (5090), including the dynamically and specifically selected sub-types inclusive of any selected combinatorial set of: scarcity of use (5010); scarcity value (5020); scarcity by work expended (5030); scarcity cost of production (5040); supply-demand scarcity limit (5050).

In FIG. 4, the steps for and the means for implementation of the preferred embodiment of the different digital money value influencing system (5090) sub-types, using the software process of steps (5000), using within it a process (5100) and a method (5200), within the digital money value influencing system (5090) operate similarly within the overall system and control the various means by which the digital money types can be used within an approved transaction authorization, communicating either the aggregate market value or the aggregate market price or both, with the teller node network (2600), using any number of teller nodes (2500) from any number of sender nodes (2000) and transferred to any number of receiver nodes (2100). With this implementation, the first market aware digital money and market aware currency is created using the said peer-to-peer digital money system (1000) and a peer-to-peer digital money (3000).

In FIG. 4, shows the steps for and the means for implementation of the preferred embodiment of the scarcity of use (5010) type that performs a systemic limitation of transaction authorization, communicating the aggregate market value with the teller node network (2600), by a dynamically and specifically selected combinatorial set of: limiting the number of times transactions can occur either over time or in total or both; limiting the frequency of occurrence over time; limiting the number of transaction uses either overtime or in total or both; by either sender nodes (2000) or receiver nodes (2100) or both.

In FIG. 4, shows the steps for and the means for implementation of the preferred embodiment of the scarcity value (5020) type that performs a systemic limitation of transaction authorization, communicating either the aggregate market value or the aggregate market price or both, with the teller node network (2600), by a dynamically and specifically selected combinatorial set of: limiting either the allowed value or the allowed price or both over time of the currency unit, limiting the value based on the frequency of either transaction authorization requests or transaction authorization or both, limiting the total number of either possible transaction authorization events or the frequency of transaction authorization events or both.

In FIG. 4, shows the steps for and the means for implementation of the preferred embodiment of the scarcity by work expended (5030) type that performs a systemic limitation of transaction authorization, communicating either the aggregate market value or the aggregate price or both, with the teller node network (2600), by forcing limited functional operations of a dynamically selected process of the transaction system, including any selected combinatorial set of: the processor subsystem, the network transactions, the storage system, any dependent computational device subsystem, to complete a dynamically and specifically selected combinatorial set of: resource dependent calculations, formulaic processing, performing transaction validation, performing data back-up, either limiting or resource loading or both the functional network communications, loading performance depleting record keeping, typical non-productive wait-state work. Therein, the computational system expends a dynamically and specifically selected combinatorial set of: natural time; computational system time; natural power resources; human capital management resources, to create either a supply-demand scarcity resource limitation or a natural time of transaction authorization limitation or both.

In FIG. 4, shows the steps for and the means for implementation of the preferred embodiment of the scarcity cost of production (5040) type that performs a systemic limitation of transaction authorization, communicating either the aggregate market value or the aggregate market price or both, with the teller node network (2600), by a dynamically and specifically selected combinatorial set of: displacing sufficient machine resource time; requiring significant human capital time; requiring significant human social capital; delaying of natural time resources. This creates either a supply-demand scarcity resource limitation or a delay of natural time of transaction authorization limitation or both. For the displacing sufficient machine resource time sub-type, the implementation of either wait-states for the computation system or excessive calculations is implemented or both. The requiring significant human social capital sub-type requires the implementation of any combinatorial set of: human interface action, human inputs, human problem-solving, human management effort, multiple human party consensus, similar human efforts. The requiring significant human social capital sub-type requires the implementation of any selected combinatorial set of: the requirement of coordinated effort of multiple humans; limited available resource credits to be allocated across parties by humans; the requirement of human social consensus for decision 1965 concurrence; similar human group dynamics restrictions. The delaying of natural time resources sub-type requires the delay of natural time across either a computing device or computer devices or both.

In FIG. 4, shows the steps for and the means for implementation of the preferred embodiment of the supply-demand scarcity limit (5050) type that performs a systemic limitation of transaction authorization, communicating either the aggregate market value or the aggregate market price or both, with the teller node network (2600), by a dynamically and specifically selected combinatorial set of: the market supply-demand inquiries of the market; the supply-demand driven rate of transaction authorization; the market supply or the market demand or both of the total number of units available; thereafter, limiting the number of any selected combinatorial set of: new currency units, the total currency units available, the total number of transaction authorizations. The market supply-demand inquiries of the market sub-type requires the implementation of any selected combinatorial set of: limiting the amount of inquiries allowed by the software process of steps (5000) for any node type; limiting the total number allowed inquiries through the teller node network (2600); limiting the number of allowed transactions with any particular teller nodes (2500). The market supply or the market demand sub-type limits the total number of allowed transactions.

Figure 5:
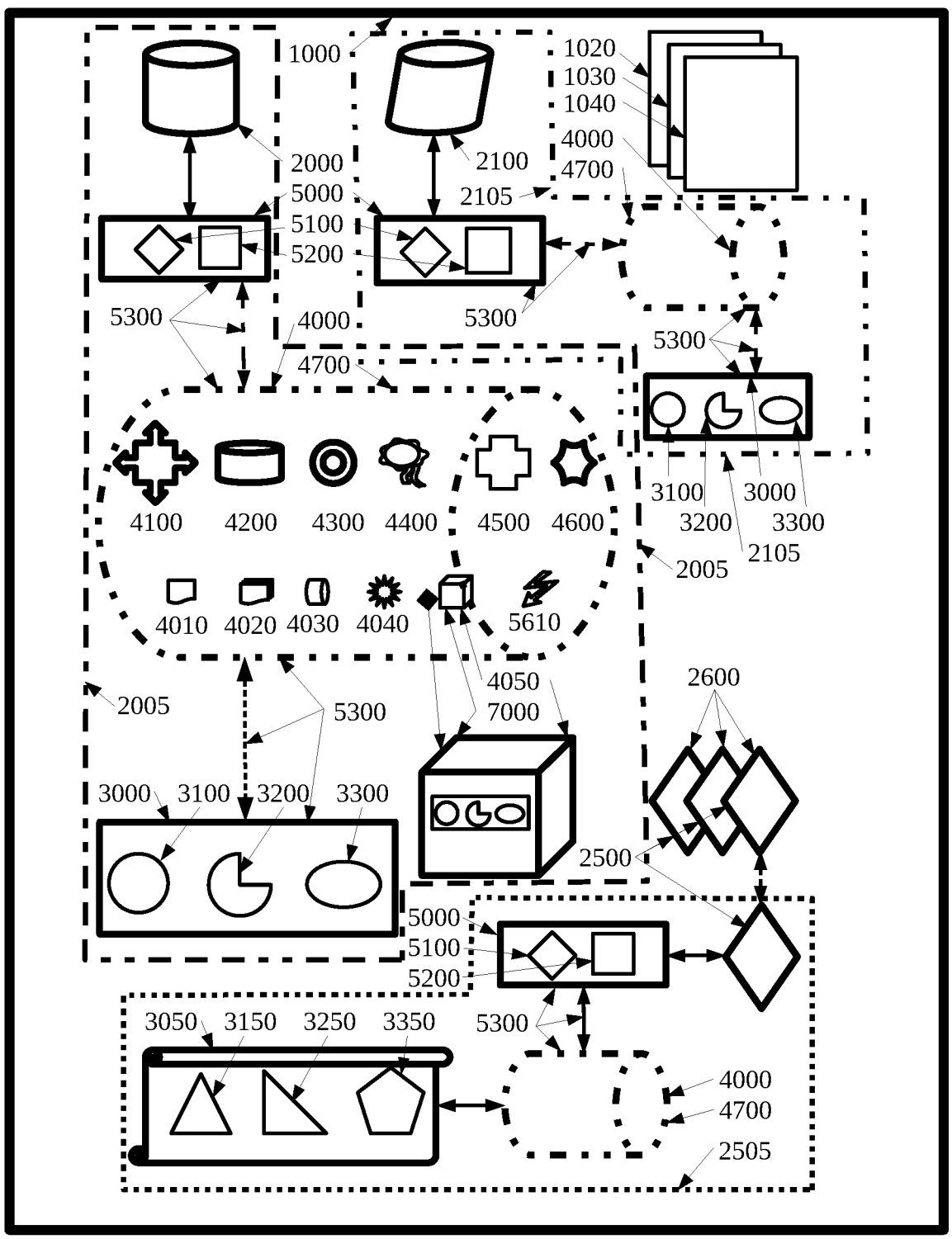
FIG. 5, is a schematic design layout of a preferred embodiment for the storage of data using the digital money system and its many parts.

In FIG. 5, shows the steps for and the means for implementation of the preferred embodiment for the storage of data using the digital money system (1000) and its many parts. The challenge in any money system with a digital component is maintaining real-time data coherence and accuracy with the proper transaction authorization for all parties. The need for accurate data synchronization is fundamental and paramount to system functionality and systemic stability for users. The primary function of the digital money system (1000) is to track and validate which sender nodes (2000) have proper ownership authorization to complete financial transactions.

In FIG. 5, shows the steps for and the means for implementation of the preferred embodiment of wherein the digital money data is either managed or transformed or both, using the digital money system (1000). For reference only and for understanding, the many parts are shown in FIG. 2 (1020), the transaction methods and processes are shown in FIG. 3 (1030), and only when selected the value influencing system is shown in FIG. 4 (1040); these figures are not required for any particular preferred embodiment and are not required to support specific claims that may reference to this specific figure. Shown are the arrowhead lines representing connection or flow and dashed lines representing included parts of the system collapsed and hidden for clarity. The digital money being stored in a storage system (4000), being stored in a medium of a dynamically and specifically selected combinatorial set of: a distributed mesh storage system (4100); digital storage medium (4200); a physical medium (4300); a physical storage system (4400); a digital network (4500); a digital storage system (4600); wherein the digital money data is either managed or transformed or both, with storage methods of a dynamically and specifically selected combinatorial set of: a digital file (4010); a set of digital files (4020); a database (4030); digital information (4040); physical embodiment data (4050); physical digital signature data (5610); only when selected, the digital money is stored within a selectable physical embodiment (7000). The physical embodiment data (4050) and the physical embodiment (7000) are shown enlarged for clarity; however, they are not actually replicated in the embodiment. The digital money storage and the digital money data, on a selectable basis, may be stored and recorded with either centralized storage or with decentralized storage or both, as shown in either a digital storage medium (4200) or distributed mesh storage system (4100) or both.

In FIG. 5, shows the steps for and the means for implementation of the preferred embodiment of how the digital money ownership authorization is maintained using the digital money system (1000). For reference only and for understanding, the many parts are shown in FIG. 2 (1020) are referenced; this figure is not required for any particular preferred embodiment and is not required to support specific claims that may reference to this specific figure. Shown are the arrowhead lines representing connection or flow and dashed lines representing included parts of the system collapsed and hidden for clarity. The digital money system (1000) enables manipulating and transforming the digital money as stored in a storage system (4000), using each of the respective node roles and each preferred embodiment; these components include: sender stack (2005), the receiver stack (2105), teller stack (2505), teller node network (2600), between any number of: sender nodes (2000), receiver nodes (2100), teller nodes (2500); using the software process of steps (5000), wherein a process (5100) and a method (5200), to manage and control a dynamically and specifically selected combinatorial set of: various business process rules; transforming processes; controlled timing conditions; transaction authorizations; transaction denials; data modifications; data validations; other type of required processes.

In FIG. 5, shows the steps and the means for implementation of the selected node roles. In the preferred embodiment, using the digital money system (1000), by using on a selected basis, any combinatorial set of: sender nodes (2000), receiver nodes (2100), teller nodes (2500), utilizing the software process of steps (5000), being implemented with a process (5100) and a method (5200), the digital money data is manipulated and transformed, utilizing a storage system (4000), the data being stored and embodied similarly in the storage method and storage process (4700).

In FIG. 5, shows the steps for and the means for implementation of the preferred embodiment of the transformation to a selectable physical embodiment (7000) that contains data stored as physical embodiment data (4050), that being a format that can be decoded, either in a physical medium or a physical storage system or both. The dynamically and specifically selected combinatorial set of: digital money (3000); digital currency (3100); virtual currency (3200); cryptocurrency (3300), is a dynamically and specifically selected combinatorial set of: a personal physical possession, personal property, capital property, property held in trust, or similar legal holding status. This encoding can be a dynamically and specifically selected combinatorial set of: magnetic bits; magnetic bytes; bar code lines; alphanumeric symbols; graphic symbols; holes; either positive dimples or negative dimples or both; either raised lines or negative lines or both; either positive rings or negative rings or both; holographic imagery; geometric shapes; similar marking implementations, wherein the data is held to the physical shape or physical state. While the physical shape and design is aesthetic in nature, the specific data state of the digital money is embedded in the physical embodiment as data.

In FIG. 5, shows the steps for and the means for implementation of the preferred embodiment of the ability to maintain value between any number of sender nodes (2000) and receiver nodes (2100), as negotiated and authorized by any number of teller nodes (2500). Value is held as a dynamically and specifically selected combinatorial set of: a personal physical possession, personal property, capital property, property held in trust, or similar legal holding status, and is maintained with a dynamically and specifically selected combinatorial set of: digital money (3000); digital currency (3100); virtual currency (3200); cryptocurrency (3300), using the software process of steps (5000), as implemented with a process (5100) and a method (5200), through any number of teller nodes (2500), this assemblage of components creates a unified data processing solution (5300). This assemblage manipulates and transforms any quantity of the digital money as stored in a storage system (4000), for a dynamically and specifically selected combinatorial set of: digital money record (3050); digital currency record (3150); virtual currency record (3250); cryptocurrency record (3350). The software process of steps (5000) can implement the data in a method wherein either the digital money or the digital money records or both, are either similar or different.

Figure 6:
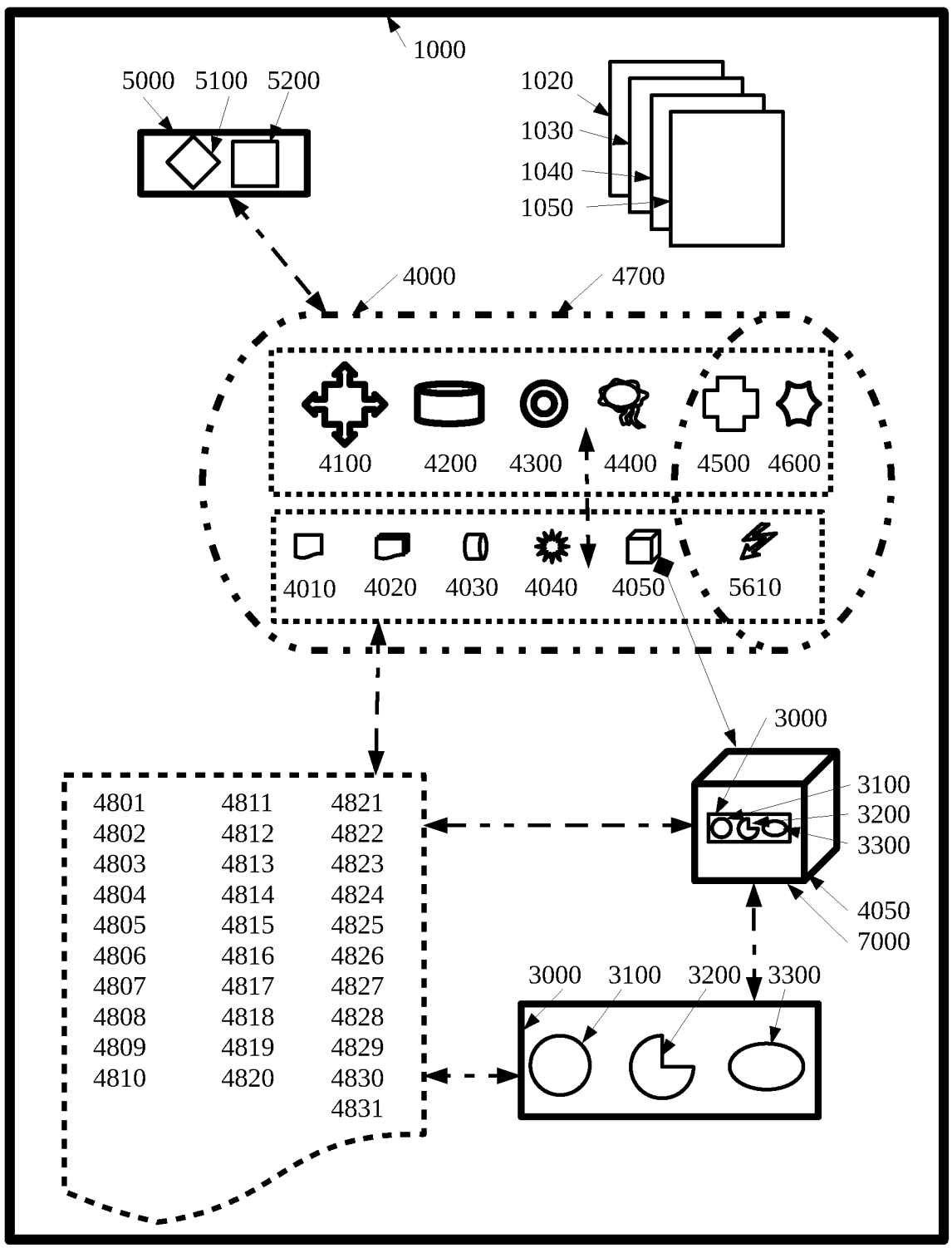
In FIG. 6, is a schematic design layout of a preferred embodiment for the data encoding and manipulation that illustrates the use of the digital money system and its many parts.

In FIG. 6, shows the steps for and the means for implementation of the preferred embodiment for the data encoding and manipulation of the digital money system (1000)

and its many parts. For reference only and for understanding, the many parts are shown in FIG. 2 (1020), the transaction methods and processes are shown in FIG. 3 (1030), only when selected the value influencing system is shown in FIG. 4 (1040), and the storage types as detailed in FIG. 5 (1050), these figures are not required for any particular preferred embodiment and are not required to support specific claims that may reference to this specific figure. Shown are the arrowhead lines representing connection or flow and dashed lines representing included parts of the system collapsed and hidden for clarity. Using the software process of steps (5000), as implemented with a process (5100) and a method (5200), manipulating and transforming the currency as stored in either a storage system (4000) or a storage method and storage process (4700) or both. The combinatorial selection of data storage types and storage methods is a security feature. The variability of either digital money types or data types or both strengthens the system for the intended use.

In FIG. 6, shows the steps for and the means for implementation of the preferred embodiment of a storage methodology with the use of the software process of steps (5000), as implemented with a process (5100) and a method (5200), the digital money type, being stored in either a storage system (4000) or a storage method and storage process (4700) or both, is shown as a dynamically and specifically selected combinatorial set of: distributed mesh storage system (4100); digital storage medium (4200); physical medium (4300); physical storage system (4400); digital network (4500); digital storage system (4600), wherein the digital money is either managed or transformed or both, with a data method of either a dynamically selected or specifically selected or both combinatorial set of: digital file (4010); digital files (4020); database (4030); digital information (4040); physical embodiment data (4050), being either user selectable or automation selectable or both, using multiple-factor authentication (5610), is shown with a dynamically and specifically selected combinatorial set of: digital money (3000); digital currency (3100); virtual currency (3200); cryptocurrency (3300); therein containing data stored in a format that can be decoded. Whereby the selectable physical embodiment (7000) is chosen and used, the data is stored within the physical material of the chosen digital money type and the chosen data method type. In an alternate embodiment, the selectable physical embodiment (7000) and the physical embodiment data (4050) is embodied either generically as a digital money or specifically as a physidigital currency or both.

In FIG. 6, shows the steps for and the means for implementation of the preferred embodiment of the data and storage medium and methods as stored in the storage system (4000). The system uses dynamic data information and can select, either a digital money or a digital money sub-type or both, as needed to establish and maintain security as determined by the software process of steps (5000), being implemented with a process (5100) and a method (5200). The digital money data contains a dynamically and specifically selected combinatorial set of: current ownership (4801); ownership history (4802); either transformation rights or transfer rights or both (4803); unique naming (4804); creation date (4805); management monitoring (4806); security authorization (4807); security codes (4808); encrypted information data (4809); security data (4810); descriptive properties for use (4811); a dynamically and specifically selected combinatorial set of: characters (4812), numbers (4813), symbols (4814); encrypted information fields (4815); either any set of: characters, numbers, symbols (4816); security codes (4817); security fields (4818); encrypted information fields (4819); authorized use validation (4820) authorized use data (4821); peer access authorization (4822); denomination value (4823); unique information within itself (4824); different step-wise values (4825); different varying values (4826); different value levels (4827); different value increments (4828); different value percentages (4829); different value decimal system based values (4830); different value fields (4831). The software process of steps (5000) chooses, based on business processes and security protocols, which data types are used and included at any particular time and are implemented in any particular embodiment. For the first time, the said digital records create a chain-of-custody record making either the digital money or the currency or both historically aware, thereby helping to reduce the incentive of transaction based ownership washing.

In FIG. 6, shows the steps for and the means for implementation of the preferred embodiment of ownership data interaction and ownership security using either the data fields or data properties or both, with the storage medium and methods as stored in the storage system (4000). Using the said data information as needed to establish and maintain security, the software process of steps (5000), being implemented with a process (5100) and a method (5200), performs and provides ownership query, ownership correction, ownership reversion, and other forms of data management and control. In the preferred embodiment, when a duly authorized judicial warrant is confirmed, by using senior administrative functions, by searching the teller node network (2600), the digital money data can be actively managed and reported using a dynamically and specifically selected combinatorial set of: current ownership (4801); ownership history (4802); either transformation rights or transfer rights or both (4803); unique naming (4804); creation date (4805); management monitoring (4806); security authorization (4807); security codes (4808); encrypted information data (4809); security data (4810); descriptive properties for use (4811); a dynamically and specifically selected combinatorial set of: characters (4812), numbers (4813), symbols (4814); encrypted information fields (4815); either any set of: characters, numbers, symbols (4816); security codes (4817); security fields (4818); encrypted information fields (4819); authorized use validation (4820) authorized use data (4821); peer access authorization (4822); denomination value (4823); unique information within itself (4824); different step-wise values (4825); different varying values (4826); different value levels (4827); different value increments (4828); different value percentages (4829); different value decimal system based values (4830); different value fields (4831). The software process of steps (5000) provides senior administrative management based on business processes and security protocols, with data types as used and included at any particular time and are implemented in any particular embodiment. This implementation allows independent ownership, geographic dispersion, and unitary data control while also simultaneously enabling the lawful use of judicial action and police action.

Figure 7:
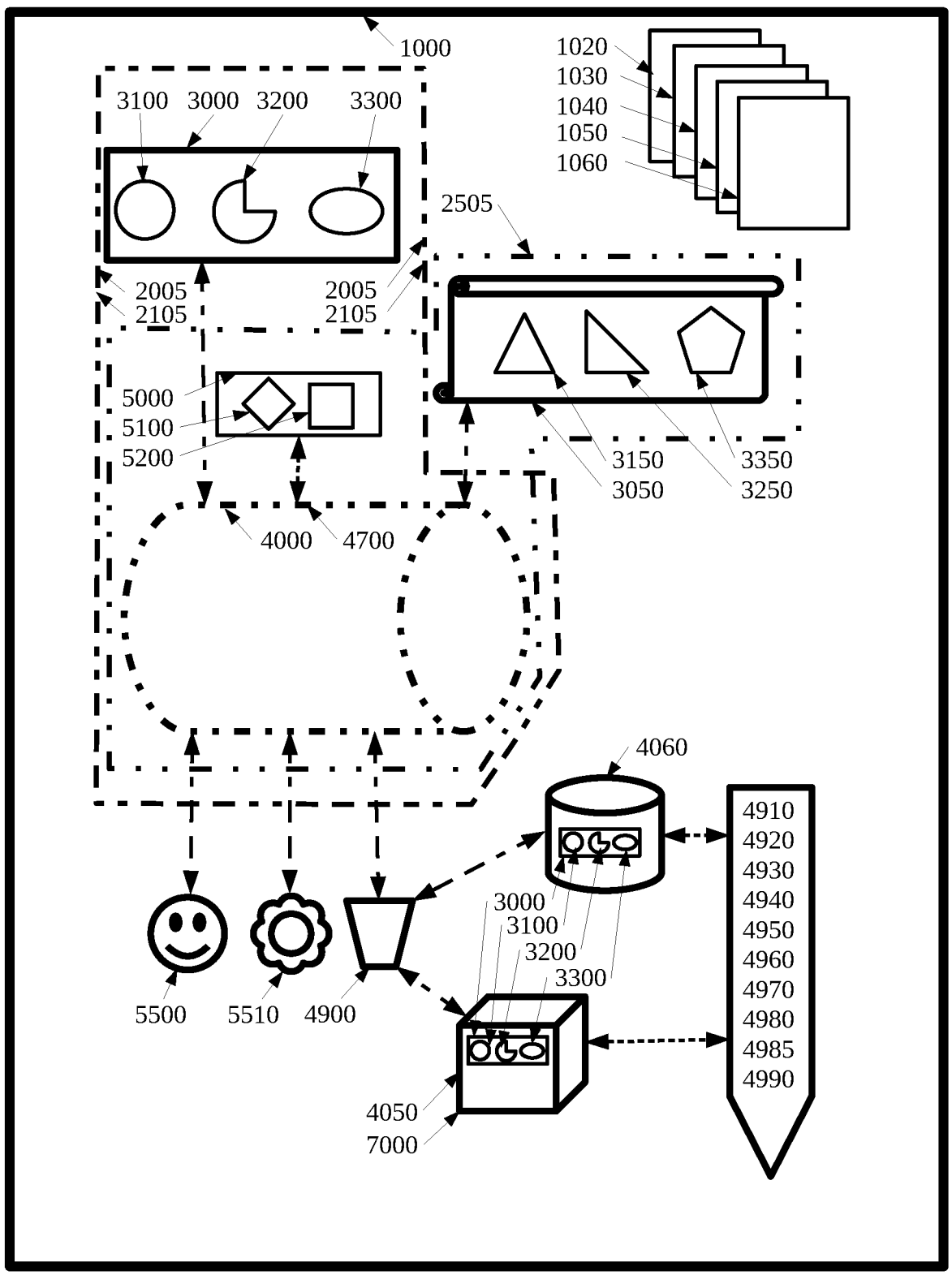
FIG. 7, is a schematic design layout of a preferred embodiment for the digital currency types and the currency data properties allowing the various interactions with differing computational system parts, users, software, methods, and processes enabling use.

In FIG. 7, shows the steps for and the means for the implementation of the preferred embodiment of the digital money types and the digital money data properties allowing the various interactions with differing computational system parts, users, software, methods, and processes enabling use as shown and described, for use within the digital money system (1000) and its many parts. For reference only and for understanding, the many parts are shown in FIG. 2 (1020), the transaction methods and processes are shown in FIG. 3 (1030), only when selected the value influencing system is shown in FIG. 4 (1040), the storage types as detailed in FIG. 5 (1050), with using data types and data fields as detailed in FIG. 6 (1060), these figures are not required for any particular preferred embodiment and are not required to support specific claims that may reference to this specific figure. Shown are the arrowhead lines representing connection or flow and dashed lines representing included parts of the system collapsed and hidden for clarity. Using each of the respective node roles and each preferred embodiment, these components include: sender stack (2005) and the receiver stack (2105), teller stack (2505), this figure shows the digital money (3000), that includes a dynamically and specifically selected combinatorial set of: digital money (3000); digital currency (3100); virtual currency (3200); cryptocurrency (3300), and the employed currency record types of any quantity, including a dynamically and specifically selected combinatorial set of: digital money record (3050); digital currency record (3150); virtual currency record (3250); cryptocurrency record (3350), with the software process of steps (5000), the various methods of manipulation and control are enabled for the digital money types. The digital money allows manipulation and transformation, by the software process of steps (5000), as implemented with a process (5100) and a method (5200), as stored in either a storage system (4000) or a storage method and storage process (4700) or both, by allowing use by a dynamically and specifically selected combinatorial set of: file browser (5500); command-line program (5510); similar programs, allowing any of the following actions on digital money data: transfer; backup; move; copy; synchronization; digital mirroring.

In FIG. 7, shows the means and steps for implementation of the physical control and management of digital money (3000). In the preferred embodiment, using digital money (3000), that may include a dynamically and specifically selected combinatorial set of: digital money (3000); digital currency (3100); virtual currency (3200); cryptocurrency (3300), encoding and authorization is performed by the software process of steps (5000) as implemented with a process (5100) and a method (5200). The digital money allows the selectable transformation, embodiment, and storage into either a selectable physical embodiment (7000) and its embedded physical embodiment data (4050) or a non-digital medium (4060) or both, and is shown with a dynamically and specifically selected combinatorial set of: digital money (3000); digital currency (3100); virtual currency (3200); cryptocurrency (3300). The various digital money types and methods allow any of the following actions on digital money data: transfer; backup; move; copy; synchronization; digital mirroring, to a dynamically and specifically selected combinatorial set of: digital medium, digital network; digital computer system; a selectable non-digital medium, a selectable transformation to a selectable physical embodiment. The digital money, through the digital money system (1000), using either a dynamically selected or a specifically selected or both, combinatorial set of: a copying process; a printing process; a rendering process; a similar process, on a selectable basis is transformed to a physical embodiment machine (4900), therein undergoing an embodiment processing device that is generally described as a dynamically and specifically selected combinatorial set of: three dimensional printer (4910); mechanical printing system (4920); mechanical stamping machine (4930); mechanical casting (4940); mechanical forging device (4950); similar physical mechanism (4960); mechanically produced coin objects (4970); mechanically produced paper currency (4980); mechanically produced paper like currency object (4985); mechanically produced card like storage object (4990).

Figure 8:
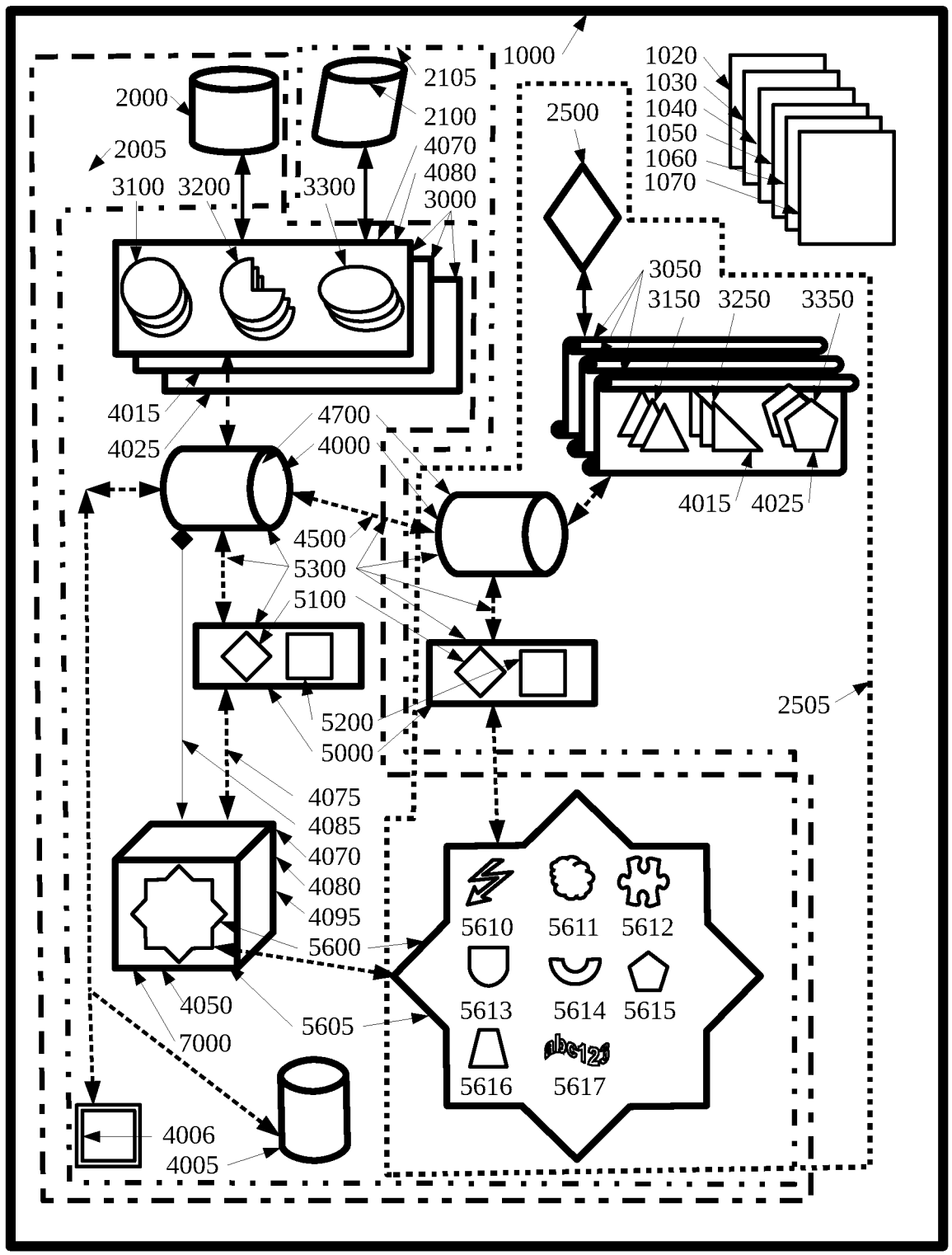
FIG. 8, is a schematic design layout of a preferred embodiment for a processing system and software program that enables digital and physical currency enumeration and transfer.

In FIG. 8, shows the steps for and the means for implementation of the preferred embodiment of the digital money system (1000), a processing system and software program that enables digital and physical currency enumeration and transfer. These methods are used within the digital money system (1000) and its many parts. For reference only and for understanding, the many parts are shown in FIG. 2 (1020), the transaction methods and processes are shown in FIG. 3 (1030), only when selected the value influencing system is shown in FIG. 4 (1040), the storage types as detailed in FIG. 5 (1050), with using data types and data fields as detailed in FIG. 6 (1060), and using the digital money types and the currency data properties as shown in FIG. 7 (1070); these figures are not required for any particular preferred embodiment and are not required to support specific claims that may reference to this specific figure. Shown are the arrowhead lines representing connection or flow and dashed lines representing included parts of the system collapsed and hidden for clarity. The digital money system (1000) includes a dynamically and specifically selected combinatorial set of: sender nodes (2000); receiver nodes (2100); teller nodes (2500), and uses the specifically needed stack: sender stack (2005); the receiver stack (2105); teller stack (2505). In any selected node role, using any quantity of the digital money (3000), that may includes a dynamically and specifically selected combinatorial set of: digital money (3000); digital currency (3100); virtual currency (3200); cryptocurrency (3300), and any quantity of the employed digital money record types, including a dynamically and specifically selected combinatorial set of: digital money record (3050); digital currency record (3150); virtual currency record (3250); cryptocurrency record (3350), using the software process of steps (5000), using within it a process (5100) and a method (5200), this assemblage of components creates a unified data processing solution (5300). The said data is stored and embodied similarly in either the storage method and storage process (4700) or in an selectable physical embodiment (7000) and its embedded physical embodiment data (4050) or both; these components enable either a dynamically selected or a specifically selected or both, combinatorial set of: physical enumeration (4075); physical counting (4085); digital enumeration (4015); individual digital counting (4025); transfer to another digital device (4005); transfer to another digital medium (4006); local possession (4070); personal possession (4080); digital device to digital device transfer (4095).

In FIG. 8, shows the steps for and the means for implementation of the preferred embodiment of how the system creates a working framework for multiple-factor authentication (5600). For reference only and for understanding, with using data types and data fields as detailed in FIG. 6 (1060), using the data encoded and enumerated sub-component parts as shown in FIG. 6 (1060). Using the storage method and storage process (4700), using the software process of steps (5000), wherein a process (5100) and a method (5200), the ownership is coordinated using a digital network (4500). When utilizing the selectable physical embodiment (7000), the data is encoded on a selectable basis within the selectable physical embodiment (7000) and in physical embodiment data (4050). A secure operating environment and transaction authorization environment is both created and enabled, using the encoding storage methods to modify either a digital money or a physical embodiment or both, using a multiple-factor authentication system (5605), the system includes any combinatorial set of: physical digital signature data (5610); keyboard input (5611); standard input-output device (5612); mouse captures (5613); audio input (5614); verbal input (5615); human-to-computer input (5616); either a hardware or software or both alphanumeric generating combinatorial set (5617).

Figure 9:
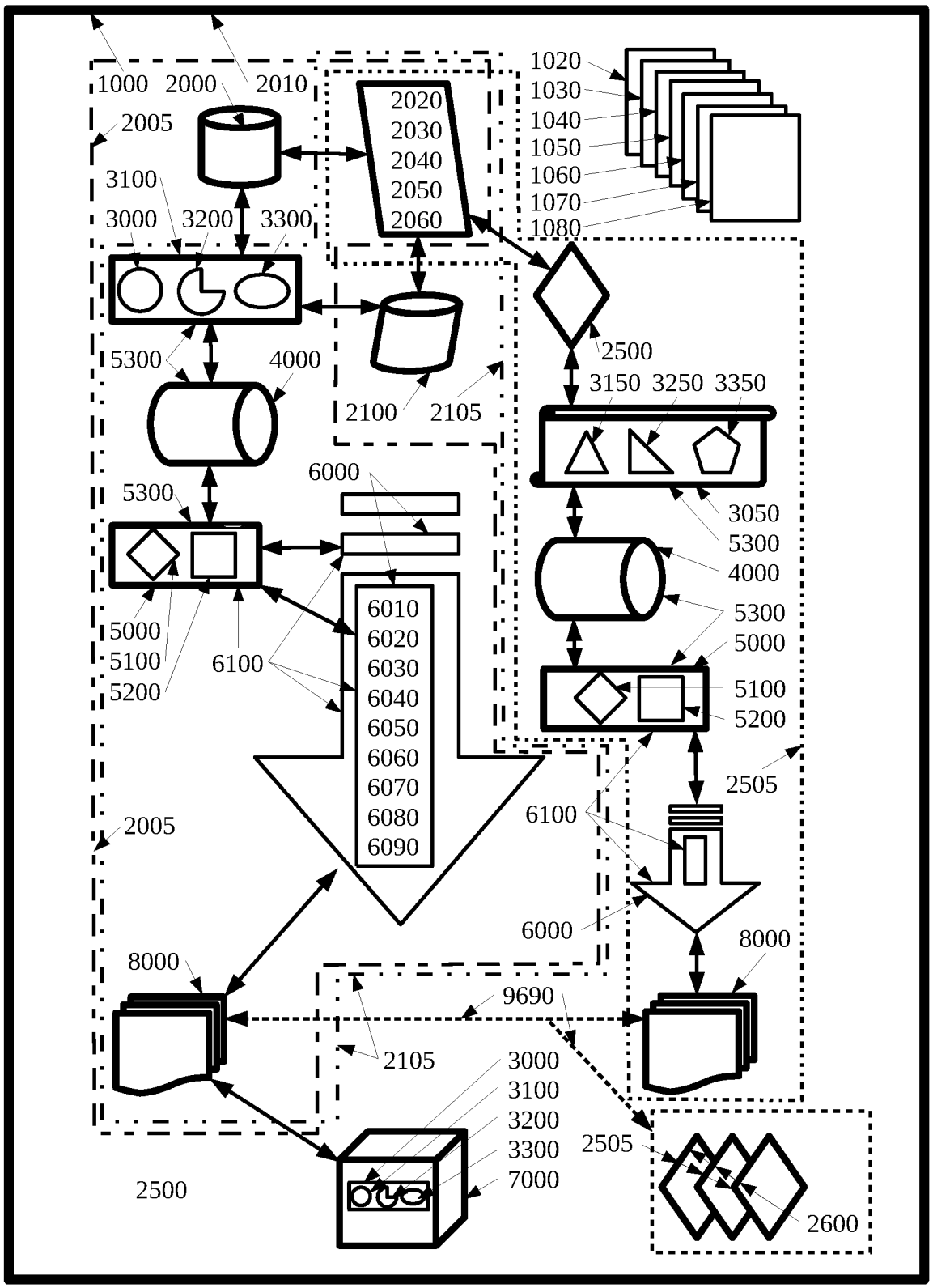
FIG. 9, is a schematic design layout of a preferred embodiment for an automated digital commerce system, using either user initiated functionality or machine initiated functionality or both, using the digital money system.

In FIG. 9, shows the steps for and the means for implementation of the preferred embodiment of a peer-to-peer automated digital commerce system (2010), using either user initiated functionality or machine initiated functionality or both, using the digital money system (1000) and its many parts. For reference only and for understanding, the many parts are shown in FIG. 2 (1020), the transaction methods and processes are shown in FIG. 3 (1030), only when selected the value influencing system is shown in FIG. 4 (1040), the storage types as detailed in FIG. 5 (1050), with using data types and data fields as detailed in FIG. 6 (1060), and using the digital money types and the digital money data properties as shown in FIG. 7 (1070), using a processing system and software program that enables digital and physical currency enumeration and transfer as shown in FIG. 8 (1080); these FIGS. are not required for any particular preferred embodiment and are not required to support specific claims that may reference to this specific figure. Shown are the arrowhead lines representing connection or flow and dashed lines representing included parts of the system collapsed and hidden for clarity. The peer-to-peer automated digital commerce system (2010) uses the software process of steps (5000), as implemented with a process (5100) and a method (5200), this assemblage of components creates a unified data processing solution (5300), that enables a dynamically and specifically selected combinatorial set of: selectable physical embodiment (7000); digital money (3000); digital currency (3100); virtual currency (3200); cryptocurrency (3300), to complete any selected combinatorial set of: enumeration; transfer; transformation using the specifically needed stack, including the sender stack (2005), the receiver stack (2105), and the teller stack (2505). Each node type is initiated as needed from a dynamically and specifically selected combinatorial set of: sender nodes (2000), receiver nodes (2100), teller nodes (2500), any number of teller nodes (2500) of the teller node network (2600). The node type either used or selected or both, operates on any number of digital computing devices running a software process of steps (5000), as stored in a storage system (4000); having with the software system a series of transaction methods (6000), and methods in a unified transaction stack (6100), these components running on a hardware process of steps (8000), and using the networking communications system (9690), within the digital money system (1000). The selectable physical manipulation generally includes a selectable physical embodiment (7000) that is, on a selectable basis, either created or transformed or both, and is shown with a dynamically and specifically selected combinatorial set of: digital money (3000); digital currency (3100); virtual currency (3200); cryptocurrency (3300).

In FIG. 9, shows the steps for and the means for implementation of the preferred embodiment for a unified transaction stack (6100) using the transaction methods (6000) and includes any number of either of standardized processes or proprietary processes or both, functions, and methods used in a dynamically and specifically selected combinatorial set of: stand-by mode (6010); listen mode (6020); monitor mode (6030); receive transmission mode (6040); send transmissions mode (6050); receive communications mode (6060); send communications mode (6070); ownership transfer authorization mode (6080); to receive ownership transfer authorization mode (6090). The software process of steps (5000) has the following listed types of behavior. In stand-by mode (6010) the system waits in a held state whereby communication and action is suspended. In listen mode (6020) the system actively listens and waits for communications from other nodes to either take action or respond to communications or both. In monitor mode (6030) the system tracks and monitors all involved node actions. In receive transmission mode (6040) the system receives communications of digital money from other nodes and send communications confirming the proper receipt of information. In send transmissions mode (6050) the system sends communications of digital money to other involved nodes and receives confirmation communications from other involved nodes. In receive communications mode (6060) the system receives communications from other nodes and send communications confirming the proper receipt of information. In send communications mode (6070) the system sends communications to other nodes and receives confirmation communications from other nodes. In ownership transfer authorization mode (6080) the communication and transfer of ownership is completed between the sender nodes, the receiver nodes, and the teller nodes, all of these modes support the receive ownership transfer authorization mode (6090). Through the said many steps and process, the ownership transfer is completed.

In FIG. 9, shows the steps for and the means for implementation of the preferred embodiment for changing any of the node types to another node type using the same structure, processes, functions, and methods within a unified transaction stack (6100). Using the software process of steps (5000), using within it a process (5100) and a method (5200), with the digital money stored in a storage system (4000), a peer-to-peer automated digital commerce system (2010) is enabled. The said system being comprised of a dynamically and specifically selected set of either node roles or node operating modes, or both, including any combinatorial set of: a user initiated mode (2020); machine initiated mode (2030); automatic receive mode (2040); automatic send mode (2050); automatic teller mode (2060).

In FIG. 9, shows the steps for and the means for implementation of the preferred embodiment of the automatic teller mode (2500) is described. When the said mode is initiated and used, the software process of steps (5000), using a process (5100) and a method (5200), having within the software system a series of transaction methods (6000), enters into the role of teller node (2500). The teller node (2500) role communicates and coordinates activity with the teller node network (2600) and synchronizes any quantity of transaction records for a dynamically and specifically selected combinatorial set of: digital money record (3050); digital currency record (3150); virtual currency record (3250); cryptocurrency record (3350). Any number of teller nodes (2500) then validate, coordinate, and authorize the transactions between any number of sender nodes (2000) and any number of receiver nodes (2100), for any quantity of digital money, the teller nodes (2500) then create and record a dynamically and specifically selected combinatorial set of: digital money record (3050); digital currency record (3150); virtual currency record (3250); cryptocurrency record (3350).

Figure 10:
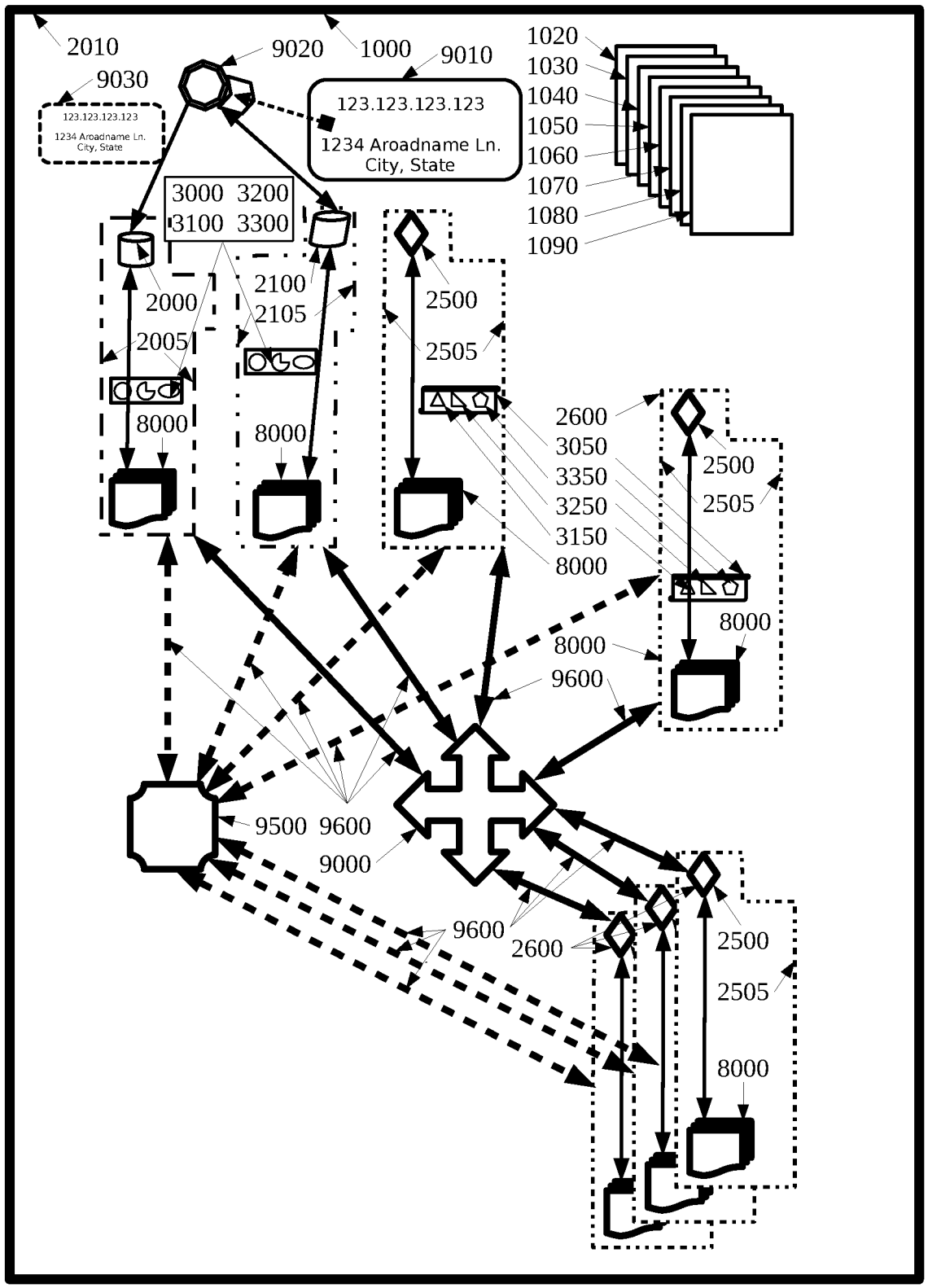
FIG. 10, is a schematic design layout of a preferred embodiment for the digital commerce system, for either manipulating or transforming or both, digital money using the digital money system.

In FIG. 10, shows the steps for and the means for implementation of the preferred embodiment of the peer-to-peer automated digital commerce system (2010), for either manipulating or transforming or both, digital money using the digital money system (1000) and its many parts. For reference only and for understanding, the many parts are shown in FIG. 2 (1020), the transaction methods and processes are shown in FIG. 3 (1030), only when selected the value influencing system is shown in FIG. 4 (1040), the storage types as detailed in FIG. 5 (1050), with using data types and data fields as detailed in FIG. 6 (1060), and using the digital money types and the digital money data properties as shown in FIG. 7 (1070), using a processing system and software program that enables digital and physical currency enumeration and transfer as shown in FIG. 8 (1080), using only when selected the peer-to-peer automated digital commerce system (2010) by using either user initiated functionality or machine initiated functionality or both as shown in FIG. 9 (1090), using the peer-to-peer automated digital commerce system (2010) as shown in FIG. 10 (1100); these figures are not required for any particular preferred embodiment and are not required to support specific claims that may reference to this specific figure. Shown are the arrowhead lines representing connection or flow and dashed lines representing included parts of the system collapsed and hidden for clarity. The preferred embodiment describes the interaction of the sender nodes (2000), receiver nodes (2100), teller nodes (2500), and teller node network (2600) using rolls described as sender nodes (2000), receiver nodes (2100), and teller nodes (2500). Throughout this description, the representation of the preferred embodiment describes the transformation of the digital money (3000), that includes a dynamically and specifically selected combinatorial set of: digital money (3000); digital currency (3100); virtual currency (3200); cryptocurrency (3300). The non-linear and peer-to-peer nature of the peer-to-peer automated digital commerce system (2010) is shown in a simple way to enable clarity of function; the descriptions and figures herein and throughout do not in any way limit a dynamically and specifically selected combinatorial set of: higher level organizations; communications; transactions; group transactions; linked transactions; linear chained transactions; non-linear chained transactions; transaction structures comprised in a dynamically and specifically selected combinatorial set of the described constituent nodes, roles, and functions. The preferred embodiment interaction is between the sender stack (2005), the receiver stack (2105), teller stack (2505), and teller node network (2600). For reference only and for understanding, the node stacks represent several parts of the system. Each role makes use of the role hardware stack enclosed within their respective embodiment to perform the sender nodes (2000), receiver nodes (2100), teller nodes (2500), and teller node network (2600) functions as required by the digital money system (1000).

In FIG. 10, shows the steps for and the means for implementation of the preferred embodiment of the peer-to-peer automated digital commerce system (2010) communication subsystem, the physical hardware and typical system software of the communication pathway signaling between the node roles is outside the scope of the claims herein; for the communication pathway, the implementation of structure, processes, methods, and high level functionality is included in this preferred embodiment. The direct digital money (3000), that includes a dynamically and specifically selected combinatorial set of: digital money (3000); digital currency (3100); virtual currency (3200); cryptocurrency (3300), completing peer-to-peer transformation (9600) over a digital money communication network (9000) or a communication network (9500) or both; are typically enabled with standard internet pathways, using either standard computing hardware or standard software or both. The pathway can be achieved over a proprietary network as needed, required, or desired. The network pathway can include signaling and communications with either wired methods or wireless methods or both. For unique security implementations, the network implementation could be any series or any selected combinatorial set of: selectable physical embodiment including a physical machine; an electrical signaling system; a light signaling system; an audio signaling system; other signaling method. The network communications implements encryption on a selectable basis within each of the respective node stack roles to guarantee and to assure that the peer-to-peer automated digital commerce system (2010) communications and transmissions are fully encased mathematically and digitally for security purposes. As the preferred embodiment and as the preferred method, the use of the generally encrypted digital money communication network (9000) is a primary and significant security feature of the peer-to-peer automated digital commerce system (2010) and the digital money system (1000).

In FIG. 10, shows the steps for and the means for implementation of the preferred embodiment of the peer-to-peer automated digital commerce system (2010) and the transaction activity enabled from the system, using the preferred embodiment and utilizing the digital money system (1000). In the preferred embodiment, the transaction typically starts with any number of sender nodes (2000), using the sender stack (2005), either by manual initiation or by automated initiation or both, initializing a peer-to-peer automated digital commerce system (2010) transaction. Using direct peer-to-peer transformation (9600) over a digital money communication network (9000) or a communication network (9500) or both, any number of receiver nodes (2100) initiate contact with both any number of sender nodes (2000) and the directly engaged any number of teller nodes (2500). Any of the included node roles determines the required contact addresses using a dynamically and specifically selected combinatorial set of: internet address; data stored address; a mapped address look-up name; contact list name; server list of names; server list of addresses; similar name look-up methods; visually recognized address (9030). When the visually recognized address (9030) method is selected, a source input address referred to as the visual representation of an address (9010) is captured and converted to digital information by either a digital camera or a visual input device (9020) or both. The digital information is then processed using standard pattern recognition techniques and library functions, utilizing any of the associated node role stack processing systems, to create the output address referred to as the visually recognized address (9030). The input address can be any selected combinatorial set of: Internet Protocol (IP) address; a physical street address; associated mapping address; a look-up address; any address of a standardized addressing system. Thereafter, any number of receiver nodes (2100), using the receiver stack (2105), are either manually initiated or automatically initiated or both, the said nodes then respond to the sender nodes (2000), using the seller stack. The order, contact, communications, and initiation of the receiver nodes (2100) and sender nodes (2000) can be reversed from either node, either as needed or required or both. Any number of the directly engaged number of teller nodes (2500) concurrently communicate and coordinate the transaction between any number of receiver nodes (2100) and any number of sender nodes (2000). During the transaction communication, the directly engaged number of teller nodes (2500) contacts any number of alternative teller nodes (2500) of the teller node network (2600). Through a business validation method that confirms various data properties, the directly engaged number of teller nodes (2500) confirms or denies the transaction authorization; thereafter, the confirmation or denial is transmitted back to the said number of sender nodes (2000). After the sender nodes (2000) receive transaction authorization confirmation from the directly engaged number of teller nodes (2500), the digital money (3000) is transferred from the sender nodes (2000), through the sender stack (2005), over either a digital money communication network (9000) or a communication network (9500) or both, through the receiver stack (2105) to the receiver nodes (2100). Then confirmation of the receipt for the receiver nodes (2100) for the digital money (3000) is sent back through either a digital money communication network (9000) or a communication network (9500) or both, to the sender nodes (2000) and to the directly engaged number of teller nodes (2500). Transaction confirmation activity from the directly engaged number of teller nodes (2500) through a hardware process of steps (8000) then propagates the transaction records, defined to include a dynamically and specifically selected combinatorial set of: digital money record (3050); digital currency record (3150); virtual currency record (3250); cryptocurrency record (3350); are sent over either over a digital money communication network (9000) or a communication network (9500) or both, to the teller node network (2600). The transaction records are synchronized and communicated across the teller node network (2600) as needed and required for transaction record keeping, record coherence, and record synchronization. Upon confirmation of the transaction records being either created or completed or both, from the teller node network (2600), the directly engaged number of teller nodes (2500) receives the confirmation and forwards the transaction authorization to sender nodes (2000). The confirmation is then forwarded and confirmed with the receiver nodes (2100). The transaction is then completed as the directly engaged nodes have confirmed transformation and transmission of the transaction from the sender nodes (2000) to the receiver nodes (2100), all nodes then disconnect.

Figure 11:
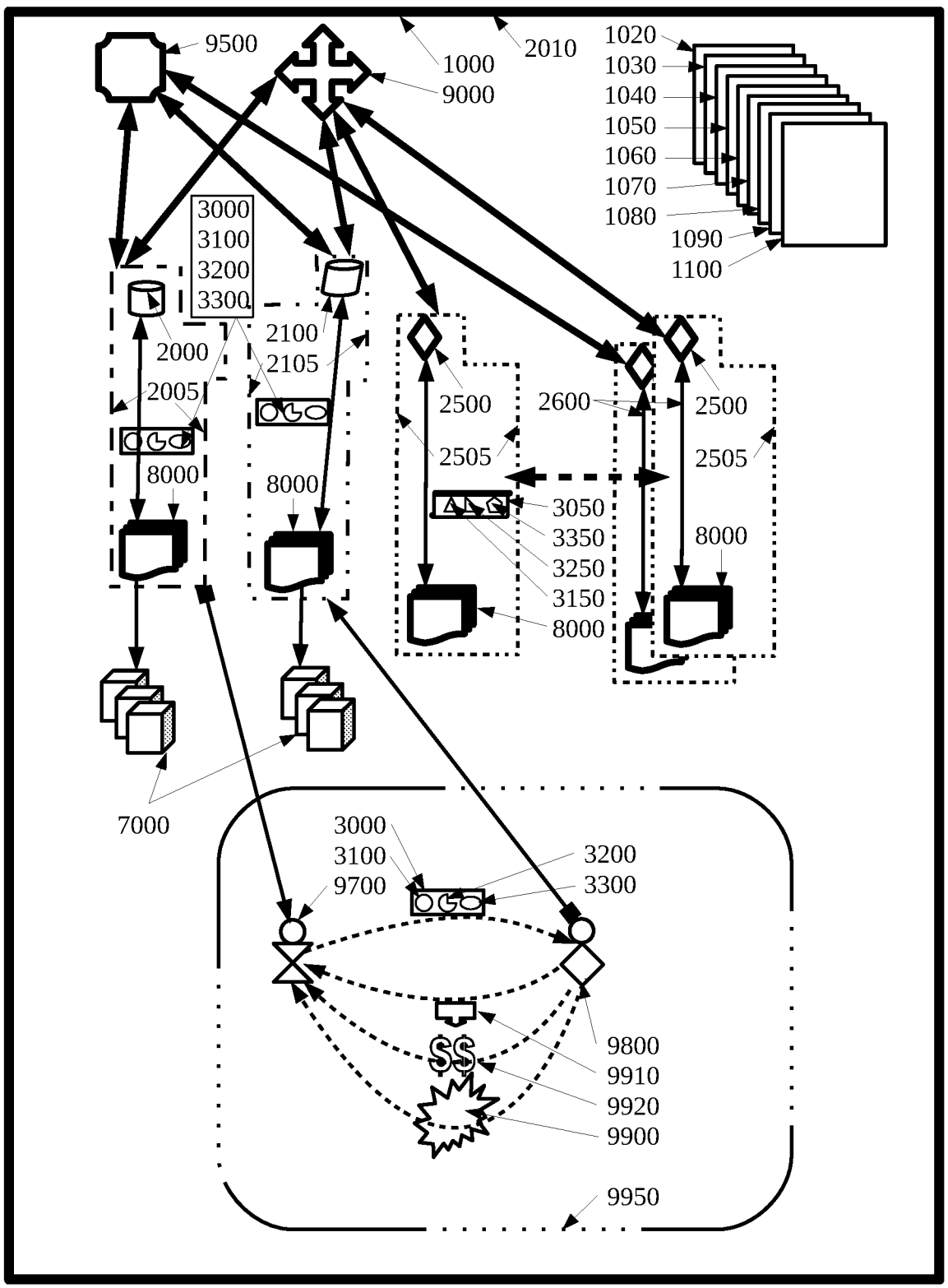
FIG. 11, is a schematic design layout of a preferred embodiment for the transformation and exchange of digital money to complete a financial transaction in exchange for any selected combinatorial set of: physical goods, services, either economic value or fiat currency value or both.

In FIG. 11, shows the steps for and the means for implementation of the preferred embodiment of a barter financial transaction (9950) completing the transformation and exchange of digital money in exchange for any selected combinatorial set of: physical goods (9900); services (9910); either economic value or fiat currency value or both (9920). Using a the digital money system (1000), for reference only and for understanding, the node stacks represent several parts of the system as defined in a dynamically and specifically selected combinatorial set of: FIG. 2 (1020); using the transaction methods and processes as shown in FIG. 3 (1030); using only when selected the value influencing system as shown in FIG. 4 (1040); with the storage types as detailed in FIG. 5 (1050); with data types and data fields as detailed in FIG. 6 (1060); using the digital money types and the digital money data properties as shown in FIG. 7 (1070); using a processing system and software program that enables digital and physical currency enumeration and transfer as shown in FIG. 8 (1080); using only when selected the automated peer-to-peer automated digital commerce system (2010) by using either user initiated functionality or machine initiated functionality or both as shown in FIG. 9 (1090); using the peer-to-peer automated digital commerce system (2010) as shown in FIG. 10 (1100); these figures are not required for any particular preferred embodiment and are not required to support specific claims that may reference to this specific figure. Shown are the arrowhead lines representing connection or flow and dashed lines representing included parts of the system collapsed and hidden for clarity. Using a dynamically and specifically selected combinatorial set of: digital money (3000); digital currency (3100); virtual currency (3200); cryptocurrency (3300), a barter financial transaction (9950) is initiated by the financial transaction sender (9700) using the sender stack (2005), whereby the sender nodes (2000) exchange a relational trade and barter value within a barter financial transaction (9950) with the financial transaction receiver (9800). Using the receiver stack (2105) and the receiver nodes (2100), the said barter financial transaction (9950) is completed by a relational trade and barter value in exchange using a dynamically and specifically selected combinatorial set of: physical goods (9900); services (9910); either economic value or fiat currency value or both (9920). The directly engaged number of teller nodes (2500) receives the confirmation and forwards the transaction authorization to sender nodes (2000) being sent over either over a digital money communication network (9000) or a communication network (9500) or both. The transaction records are synchronized and communicated across the teller node network (2600) as needed and required for transaction record keeping, record coherence, and record synchronization. Upon confirmation of the transaction records being either created or completed or both, from the teller node network (2600), the directly engaged number of teller nodes (2500) receives the confirmation and forwards the transaction authorization to sender nodes (2000). The confirmation is then forwarded and confirmed with the receiver nodes (2100). The transaction is then completed as the directly engaged nodes have confirmed transformation and transmission of the transaction from the sender nodes (2000) to the receiver nodes (2100), all nodes then disconnect. In an alternate embodiment, either the sender nodes (2000) or the receiver nodes (2100) or both, on a selectable basis hold, store, archive, and collect a physical embodiment (7000) of digital money on a selectable basis.

Figure 12:
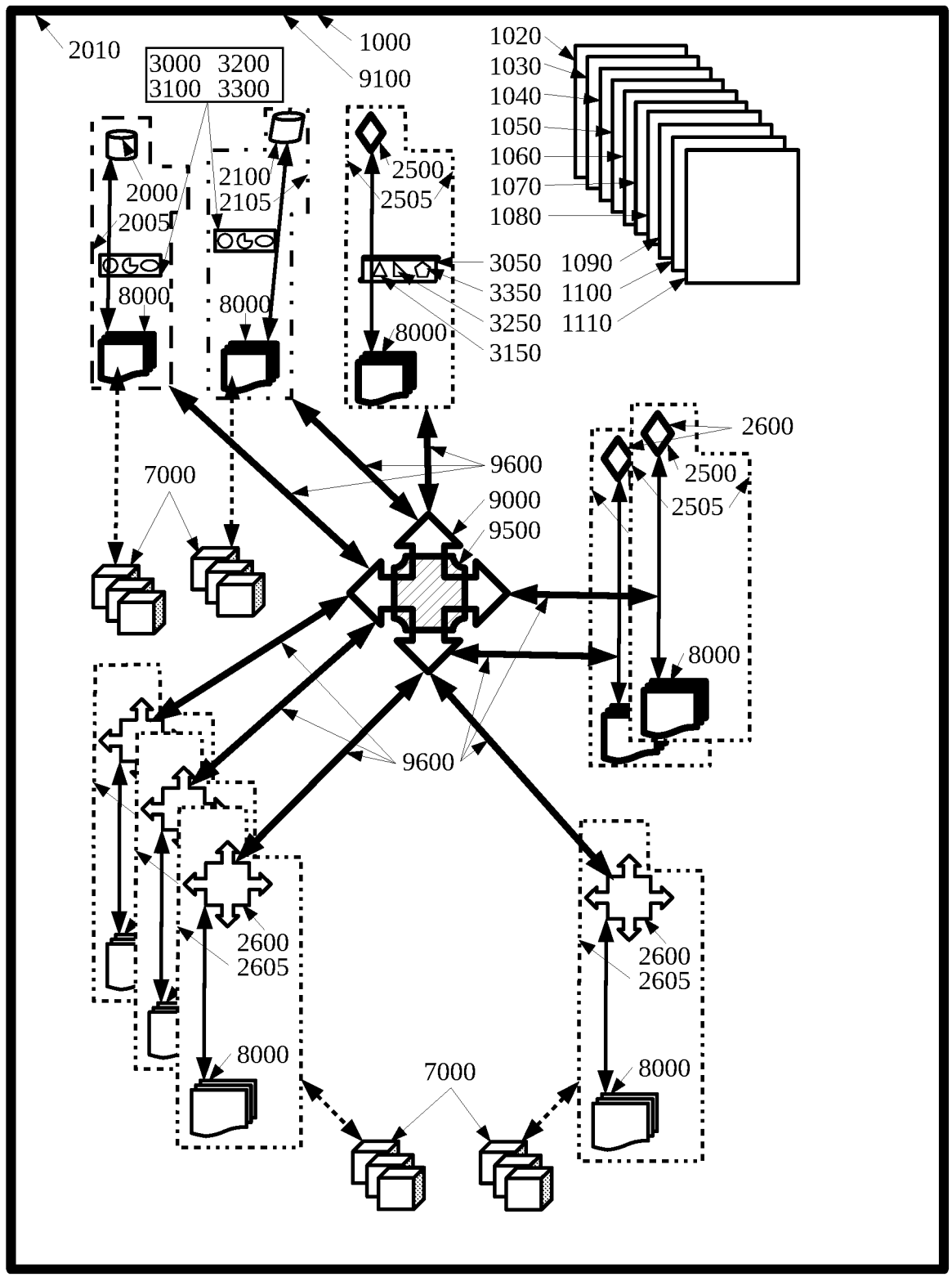
FIG. 12, is a schematic design layout of a preferred embodiment of the digital aggregator handling system for using the digital money system and its many parts.

In FIG. 12, shows the steps for and the means for implementation of the preferred embodiment of the digital aggregator handling system (9100). For reference only and for understanding, using a the digital money system (1000), the many parts are shown and defined in a dynamically and specifically selected combinatorial set of: FIG. 2 (1020); using the transaction methods and processes as shown in FIG. 3 (1030); using only when selected the value influencing system as shown in FIG. 4 (1040); with the storage types as detailed in FIG. 5 (1050); with data types and data fields as detailed in FIG. 6 (1060); using the digital money types and the digital money data properties as shown in FIG. 7 (1070); using a processing system and software program that enables digital and physical currency enumeration and transfer as shown in FIG. 8 (1080); using only when selected the peer-to-peer automated digital commerce system (2010) by using either user initiated functionality or machine initiated functionality or both as shown in FIG. 9 (1090); using the peer-to-peer automated digital commerce system (2010) as shown in FIG. 10 (1100); using the exchange of digital money to complete a barter financial transaction (9950) in exchange for economic value as shown in FIG. 11 (1110); these figures are not required for any particular preferred embodiment and are not required to support specific claims that may reference to this specific narrative. Shown are the arrowhead lines representing connection or flow and dashed lines representing included parts of the system collapsed and hidden for clarity. The said digital money system (1000), facilitates communication and transfer activity for any quantity of either value or data or both, with any number of dynamically and specifically selected combinatorial set of: sender nodes (2000); receiver nodes (2100); teller nodes (2500); teller node network (2600), using the components of a dynamically and specifically selected combinatorial set of: sender stack (2005); the receiver stack (2105); teller stack (2505); teller node network (2600); inclusive of the hardware process of steps (8000); communication through direct peer-to-peer transformation (9600); and transferring through either a digital money communication network (9000) or a communication network (9500) or both. On a selectable basis and when used, the said digital money system (1000) utilizes either an aggregator holder node (2600) or aggregator holder nodes (2605) or both. Utilizing the peer-to-peer automated digital commerce system (2010), with the addition of either an aggregator holder (2600) or aggregator holders nodes (2605) or both, the facilitation of either the hold of value or the transfer of value is achieved by communicating with the multiple node stack roles. The said aggregator nodes, in any combinatorial set of: facilitation of communication between multiple nodes; facilitation of financial transaction hold; facilitation of transaction authorization; by directly holding other third-party node digital money, the higher level and multiple node aggregation capability enables a dynamically and specifically selected combinatorial set of: multiple node transaction facilitation and communication; multiple node digital aggregator handling; multiple node financial transactions; multiple node trust handling. These many capabilities create a dynamically and specifically selected combinatorial set of: third-party node aggregator handling authorization; third-party node trading authorization; third-party node exchange authorization; industry standard third-party banking activity; third-party credit and lending activity; third-party escrow activity; trust account holding; peer-to-peer trading communities; similar value exchange activity.

In FIG. 12, shows the steps for and the means for implementation of the preferred embodiment of the transformation of value using the digital aggregator handling system (9100), over various node roles stacks, that includes a dynamically and specifically selected combinatorial set of: digital money (3000); digital currency (3100); virtual currency (3200); cryptocurrency (3300), being authorized by the teller nodes (2500) and the teller node network (2600), and on a selectable basis communicating with an aggregator holder node (2600); either creating or coordinating or both, the associated transaction records, defined to include a dynamically and specifically selected combinatorial set of: digital money record (3050); digital currency record (3150); virtual currency record (3250); cryptocurrency record (3350). The node stacks include: sender stack (2005); receiver stack (2105); teller stack (2550); teller node network (2600); when selected, an aggregator holder node (2600). Each of the said node roles make use of the role stack and components, using the hardware and software within each of their respective node roles, to perform the associated roles of: sender nodes (2000), receiver nodes (2100), teller nodes (2500), teller node network (2600); that together function as required by the digital money system (1000).

In FIG. 12, shows the steps for and the means for implementation of the preferred embodiment of the digital aggregator handling system (9100) is shown using the preferred embodiment and utilizing the digital money system (1000). The transaction starts with any number of sender nodes (2000), using the sender stack (2005), either by user manual initiation or by automated initiation or both, initializing a peer-to-peer automated digital commerce system (2010) transaction. Using direct peer-to-peer transformation (9600) over a digital money communication network (9000) or a communication network (9500) or both, that are in FIG. 12 shown overlapping for simplicity; any number of sender nodes (2000) initiate contact with either an aggregator holder node (2600) or aggregator holder nodes (2605) or both; thereafter, any number of receiver nodes (2100) and the directly engaged number of teller nodes (2500) are either contacted or messaged or both; utilizing the hardware process of steps (8000), direct peer-to-peer transformation (9600), and transferring through either a digital money communication network (9000) or a communication network (9500) or both. The included node roles determine the required contact addresses using a dynamically and specifically selected combinatorial set of: internet address; data stored address; a mapped address look-up name; contact list name; server list of names; computer server list of addresses; similar name look-up methods. Any number of receiver nodes (2100), using the receiver stack (2105), that are either manually initiated or automatically initiated or both, then respond to either an aggregator holder node (2600) or aggregator holder nodes (2605) or both. Any number of sender nodes (2000) are communicated and coordinated with either an aggregator holder node (2600) or aggregator holder nodes (2605) or both. The order, contact, communication, and initiation of the receiver nodes (2100), sender nodes (2000), and aggregator holder nodes (2605) can be either reversed or changed or both, from any node role either as needed, as required, as requested, or by utilizing any unique grouping thereof. Any number of the directly engaged teller nodes (2500), concurrently communicate and coordinate the transaction between any number of: receiver nodes (2100); sender nodes (2000); aggregator holder node (2600); aggregator holder nodes (2605). During the transaction communication, the directly engaged number of teller nodes (2500) contacts any number of alternative teller nodes (2500) of the teller node network (2600). Through a proprietary validation method that confirms various data properties, the directly engaged number of teller nodes (2500) either confirms or denies or both, the transaction authorization; thereafter, either the transaction confirmation or transaction denial or both, is transmitted back to any number of: sender nodes (2000); receiver nodes (2100); when selected either an aggregator holder node (2600) or an aggregator holder nodes (2605) or both. Only after the sender nodes (2000), the receiver nodes (2100), and when selected the aggregator holder node (2600), receive transaction authorization confirmation from the directly engaged number of teller nodes (2500), a dynamically and specifically selected combinatorial set of: digital money (3000); digital currency (3100); virtual currency (3200); cryptocurrency (3300); is transferred from the sender nodes (2000), through the sender stack (2005), over either a digital money communication network (9000) or a communication network (9500) or both, through the receiver stack (2105) to the receiver nodes (2100). In an alternate embodiment and when selected, the receive transaction authorization confirmation is sent to either an aggregator holder node (2600) or an aggregator holder nodes (2605) or both. Thereafter, confirmation of the receipt for the receiver nodes (2100) for the digital money (3000) is sent back through either a digital money communication network (9000) or a communication network (9500) or both, to the sender nodes (2000) and either an aggregator holder node (2600) or aggregator holder nodes (2605) or both, to the directly engaged number of teller nodes (2500). Transaction confirmation activity from the directly engaged number of teller nodes (2500) then propagates the transaction records, defined to include a dynamically and specifically selected combinatorial set of: digital money record (3050); digital currency record (3150); virtual currency record (3250); cryptocurrency record (3350), are sent over either over a digital money communication network (9000) or a communication network (9500) or both, to the teller node network (2600). The transaction records are synchronized and communicated across the teller node network (2600) to achieve the business defined need and requirement for record keeping, record coherence, and record synchronization. Upon confirmation of the transaction records being either created or completed or both, from the teller node network (2600), the directly engaged number of teller nodes (2500) receives the confirmation and forwards the transaction authorization to the receiver nodes (2100), sender nodes (2000), and either an aggregator holder node (2600) or aggregator holder nodes (2605) or both. The transaction is then completed as the directly engaged and needed nodes have both completed and confirmed the transformation, transmission, and confirmation of the transaction from the sender nodes (2000), receiver nodes (2100), teller nodes (2500), the teller node network (2600), and either an aggregator holder node (2600) or aggregator holder nodes (2605) or both.

In FIG. 12, shows the steps for and the means for implementation of the preferred embodiment of the digital aggregator handling system (9100) utilizing an aggregator method and process to store value using the selectable physical embodiment (7000). Using direct peer-to-peer communication and peer-to-peer transformation (9600) over a digital money communication network (9000) or a communication network (9500) or both, utilizing any number of sender nodes (2000) inclusive of the hardware process of steps (8000), through the sender stack (2005) inclusive of the hardware process of steps (8000), into a selectable physical embodiment (7000), including therein a dynamically and specifically selected combinatorial set of: digital money (3000); digital currency (3100); virtual currency (3200); cryptocurrency (3300), and only when selected is transferred to either an aggregator holder node (2600) or to aggregator holder nodes (2605) or both. When selected, the said selectable physical embodiment (7000) is either held or created or both, for either the sender nodes (2000) or the receiver nodes (2100) or both, utilizing the hardware process of steps (8000). With read-write access from either the sender nodes (2000) or the receiver nodes (2100) or both, to either the aggregator holder node (2600) or aggregator holder nodes (2605) or both, the selectable physical embodiment (7000) can be held or then physically transferred to any selected combinatorial set of: other sender nodes (2000), other receiver nodes (2100), other aggregator holder node (2600), other aggregator holder nodes (2605). When transfer is selected, an initiation communication is made to a dynamically and specifically selected combinatorial set of: an aggregator holder node (2600); aggregator holder nodes (2605); sender nodes (2000); receiver nodes (2100), utilizing the hardware process of steps (8000), direct peer-to-peer transformation (9600), and transferring through either a digital money communication network (9000) or a communication network (9500) or both. The transfer process is repeated, therefrom the system as outlined creates a digital aggregator handling system (9100) to enable and perform a dynamically and specifically selected combinatorial set of: third-party handling authorization; third-party trading authorization; third-party exchange authorization; industry standard third-party banking like activity; trust account holding; escrow holding; peer-to-peer trading communities; similar value exchange either through the assistance of a third-party. The system performs digital transmission as outlined throughout; the selectable physical embodiment allows physical transmission.

Figure 14:
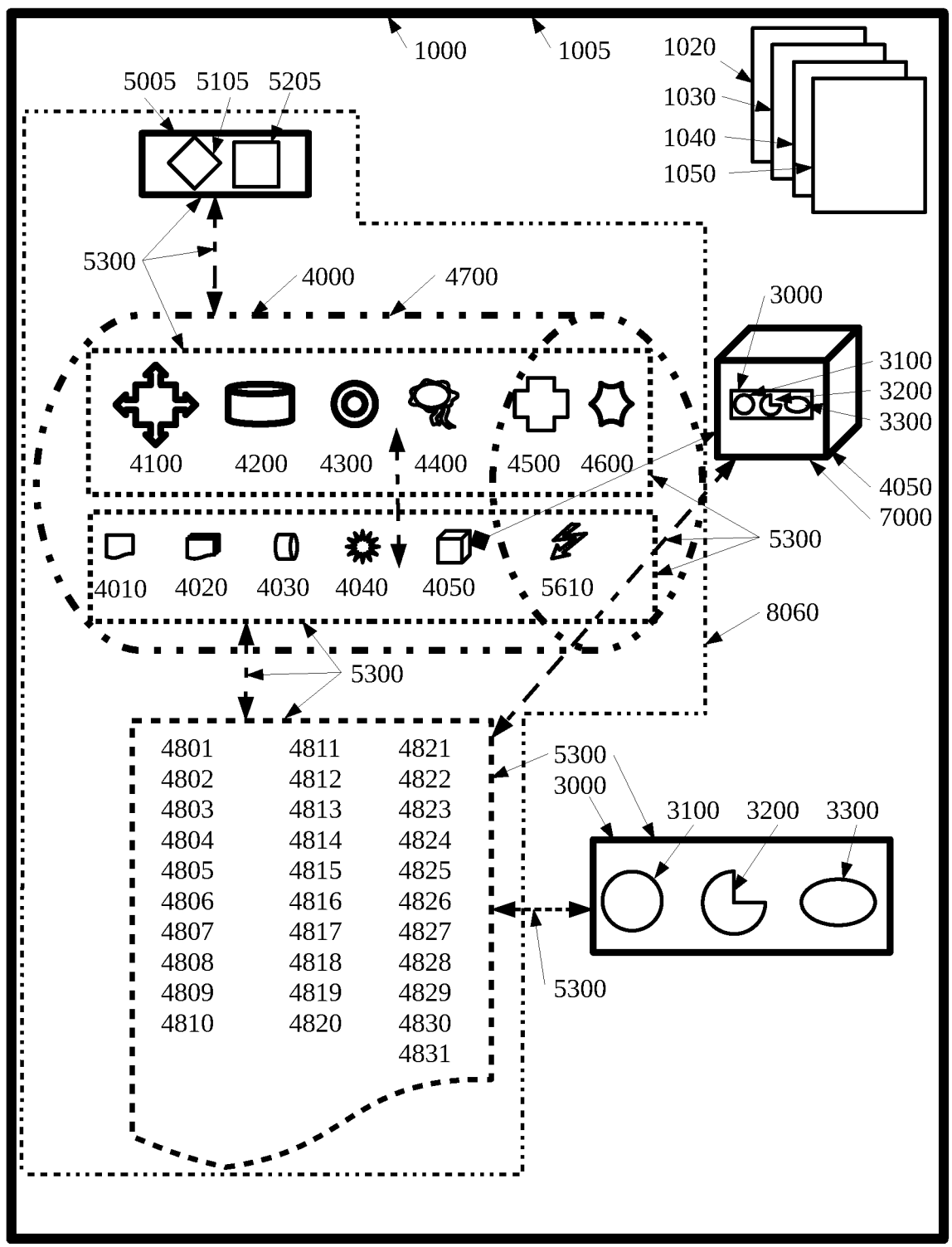
FIG. 14, is a schematic design layout of a preferred embodiment for the digital currency minting system for creation of either digital coin or unitary digital coin or both.

In FIG. 14, shows the steps for and the means for implementation of the preferred embodiment for the digital money minting system (1005) for use with the digital money system (1000) and its many parts. For reference only and for understanding, the many parts are shown as defined in a dynamically and specifically selected combinatorial set of: FIG. 2 (1020); the transaction methods and processes are shown in FIG. 3 (1030); only when selected the value influencing system is shown in FIG. 4 (1040); and the storage types as detailed in FIG. 5 (1050; these figures are not required for any particular preferred embodiment and are not required to support specific claims that may reference to this specific figure. Shown are the arrowhead lines representing connection or flow and dashed lines representing included parts of the system collapsed and hidden for clarity. Using the digital money minting software process of steps (5005), as implemented with a minting process (5105) and a minting method (5205), in the preferred embodiment, encryption is implemented on a selectable basis, the money being stored in either a storage system (4000) or a storage method and storage process (4700) or both. This assemblage of components creates a unified data processing solution (5300). In an alternative embodiment, the software and hardware items are combined: digital money minting software process of steps (5005); minting process (5105); minting method (5205); storage system (4000); storage process (4700); unified data processing solution (5300), making a combined minting hardware device (8060). The said components either generate or spawn or both, the combinatorial selection of data storage types and storage methods, this provides a set of strong security features. The variability of either digital money types or data types or both, strengthens the system for the intended use, for any selected combinatorial set of: digital money (3000); digital currency (3100); virtual currency (3200); cryptocurrency (3300), inclusive of: unitary digital coins; physidigital currency; utility tokens; electronic money; electronic currency; central bank issued money accounted for in a computer database; variations of computer based money; computerized economic store-of-value; other similar terms for transacting either digital value or economic value or both. The said components and system parts are then stored in a medium of a dynamically and specifically selected combinatorial set of: a distributed mesh storage system (4100); digital storage medium (4200); a physical medium (4300); a physical storage system (4400); a digital network (4500); a digital storage system (4600), whereby the digital money data is either generated or spawned or both, with storage methods of a dynamically and specifically selected combinatorial set of: a digital file (4010); a set of digital files (4020); a database (4030); digital information (4040); physical embodiment data (4050); physical digital signature data (5610); only on a selectable basis, the digital money is stored within a physical embodiment (7000) and in physical embodiment data (4050). The digital money minting software process of steps (5005), as implemented with a minting process (5105) and a minting method (5205); either generates or spawns or both, either the digital money data or the digital money properties or both, that contains a dynamically and specifically selected combinatorial set of: current ownership (4801); ownership history (4802); either transformation rights or transfer rights or both (4803); unique naming (4804); creation date (4805); management monitoring (4806); security authorization (4807); security codes (4808); encrypted information data (4809); security data (4810); descriptive properties for use (4811); a dynamically and specifically selected combinatorial set of: characters (4812), numbers (4813), symbols (4814); encrypted information fields (4815); either any set of: characters, numbers, symbols (4816); security codes (4817); security fields (4818); encrypted information fields (4819); authorized use validation (4820) authorized use data (4821); peer access authorization (4822); denomination value (4823); unique information within itself (4824); different step-wise values (4825); different varying values (4826); different value levels (4827); different value increments (4828); different value percentages (4829); different value decimal system based values (4830); different value fields (4831). The digital money minting software process of steps (5005), as implemented with a minting process (5105) and a minting method (5205), being stored in a storage system (4000), thereby either generates or spawns or both, with the said data fields or data properties or both, a dynamically and specifically selected combinatorial set of: digital money (3000); digital currency (3100); virtual currency (3200); cryptocurrency (3300), inclusive of: unitary digital coins; physidigital currency; utility tokens; electronic money; electronic currency; central bank issued money accounted for in a computer database; variations of computer based money; computerized economic store-of-value; other similar terms for transacting either digital value or economic value or both. The digital money minting 3030 software process of steps (5005), as implemented with a minting process (5105) and a minting method (5205), as needed by either business functions or by technical functionality or both, computes and calculates the said data fields or data properties or both.

The invention claimed is:

1. A peer-to-peer (P2P) system, for coordinating transfers between a sender node and receiver node, the P2P system comprising:
 a sender node, wherein the sender node:
  comprises:
   a computing device, and
   a digital sender node storage, configured to store a set of records corresponding to ownership of digital information, wherein the set of records comprises distributed and cryptographically encoded shards of information; and
  is configured to:
   send the set of records to a first teller node, of a plurality of teller nodes, alongside an authorization request for digital information to be transferred to a receiver node, and
   upon receiving authorization from the first teller node, transfer the digital information to the receiver node and transmit confirmation of completion of the transfer to the first teller node; and
 a teller node network comprising the plurality of teller nodes, wherein:
  the plurality of teller nodes are communicatively coupled in a mesh network configuration;
  each teller node of the plurality of teller nodes is a computer comprising its own teller node storage,
  the first teller node is configured to confirm ownership, by the sender node, of the digital information to be transferred by:
   providing certain records of the set of records, corresponding to the digital information to be transferred to the receiver node, to a subset of the plurality of teller nodes,
   receiving, from the subset of the plurality of teller nodes, confirmation of ownership of the digital information to be transferred by the sender node, wherein each of the subset of the plurality of teller nodes is configured to match the certain records with individual records stored in its own teller node storage, and
   transmitting authorization to the sender node based on the confirmation of ownership, the sender node transfers the digital information to the receiver node; and
  upon receiving the confirmation of the completion of the transfer, the first teller node is further configured to replicate and transmit, to the subset of the plurality of teller nodes, at least one new record corresponding to the completed transfer.

2. The P2P system of claim 1, wherein each teller node of the subset of the plurality of teller nodes is configured to store the at least one new record corresponding to the completed transfer in its teller node storage.

3. The P2P system of claim 1, wherein the receiver node is configured to confirm the completion of the transfer with the sender node before the sender node transmits the confirmation of the completion of the transfer to the first teller node.

4. The P2P system of claim 1, wherein, over a set duration of time, the teller node network is configured to limit at least one of:
 a frequency of transfers authorized by nodes from the plurality of teller nodes; or
 a total number of transfers authorized for at least one of the set of records.

5. The P2P system of claim 1, wherein the teller node network is configured to synchronize, across the plurality of teller nodes, the at least one new record corresponding to the completed transfer, after the at least one new record is replicated and transmitted.

6. The P2P system of claim 1, further comprising an aggregator node, wherein:
 the aggregator node is configured to coordinate actions that are associated with the certain records of the set of records being transmitted to nodes across the teller node network; and
 the aggregator node is configured to coordinate the actions by sending and receiving messages to at least one of the group consisting of teller nodes, sender nodes, and receiver nodes.

7. The P2P system of claim 1, wherein, for a given teller node of the subset of the plurality of teller nodes, when matching the certain records with individual records stored in its own teller node storage is unsuccessful, the given teller node transmits a rejection status to other teller nodes of the plurality of teller nodes across the teller node network.

8. The P2P system of claim 1, wherein the digital information that is transferred comprises at least one from the group consisting of: digital currency, virtual currency, cryptocurrency, unitary digital coins, physidigital currency defined as a currency that is both physically embodied and has digital records of the set of records, utility tokens, electronic money, electronic currency, central bank issued money accounted for in a computer database, computer-based money, and computerized economic store-of-value.

9. The P2P system of claim 1, wherein:
 each of the set of records comprises a plurality of data fields; and
 a data field of the plurality of data fields is selected from the group consisting of current ownership, ownership history, digital information transfer rights, security authorization data, security codes, and encrypted information data.

10. The P2P system of claim 1, wherein:
individual corresponding records from the set of records are decrypted by at least one of the group consisting of teller nodes, sender nodes, and receiver nodes; and
the decryption is performed using information stored in the authorization request.

11. A method for authorizing an ownership transfer between a sender node and receiver node, the method comprising:
receiving, from a sender node, a set of records corresponding to ownership of digital information, wherein;
the set of records comprises distributed and cryptographically encoded shards of information;
the set of records are sent alongside an authorization request for digital information to be transferred to a receiver node; and
the sender node comprises a computing device and a digital information sender node storage;
providing certain records of the set of records, corresponding to the digital information to be transferred to the receiver node, to a plurality of teller nodes, wherein the plurality of teller nodes:
makes up at least part of a teller node network; and
are communicatively coupled in a mesh network configuration;
receiving, from the plurality of teller nodes, confirmation of ownership of the digital information to be transferred by the sender node, wherein each of the plurality of teller nodes is configured to match the certain records with individual records stored in its own teller node storage;
transmitting authorization to the sender node based on the confirmation of ownership;
receiving, from the sender node, confirmation of completion of the transfer in response to the authorization; and
replicating and transmitting, to the plurality of teller nodes, at least one new record corresponding to the completed transfer.

12. The method of claim 11, wherein each teller node of the plurality of teller nodes is configured to store the at least one new record corresponding to the completed transfer in its teller node storage.

13. The method of claim 11, wherein the receiver node is configured to confirm the completion of the transfer with the sender node before the sender node transmits the confirmation of the completion of the transfer.

14. The method of claim 11, wherein, over a set duration of time, the teller node network is configured to limit at least one of:
a frequency of transfers authorized by nodes from the plurality of teller nodes; or
a total number of transfers authorized for at least one of the set of records.

15. The method of claim 11, wherein the teller node network is configured to synchronize, across the plurality of teller nodes, the at least one new record corresponding to the completed transfer, after the at least one new record is replicated and transmitted.

16. The method of claim 11, wherein:
actions, which are associated with the certain records of the set of records being transmitted to nodes across the teller node network, are coordinated by an aggregator node; and
the actions are coordinated by the aggregator node sending and receiving messages to at least one of the group consisting of teller nodes, sender nodes, and receiver nodes.

17. The method of claim 11, wherein, for a given teller node of the plurality of teller nodes, when matching the certain records with the individual records stored in its own teller node storage is unsuccessful, the given teller node transmits a rejection to other teller nodes of the plurality of teller nodes across the teller node network.

18. The method of claim 11, wherein the digital information that is transferred comprises at least one from the group consisting of: digital currency, virtual currency, cryptocurrency, unitary digital coins, physidigital currency defined as a currency that is both physical embodied and has digital records on the set of records, utility tokens, electronic money, electronic currency, central bank issued money accounted for in a computer database, computer-based money, and computerized economic store-of-value.

19. The method of claim 11, wherein:
each of the set of records comprises a plurality of data fields; and
a data field of the plurality of data fields is selected from the group consisting of current ownership, ownership history, digital money transfer rights, security authorization data, security codes, and encrypted information data.

20. The method of claim 11, wherein:
individual corresponding records from the set of records are decrypted by at least one of the group consisting of teller nodes, sender nodes, and receiver nodes, and the decryption is performed using information stored in the authorization request.

* * * * *